United States Patent [19]
S et al.

[11] Patent Number: 5,714,866
[45] Date of Patent: Feb. 3, 1998

[54] METHOD AND APPARATUS FOR FAST BATTERY CHARGING USING NEURAL NETWORK FUZZY LOGIC BASED CONTROL

[75] Inventors: Dilip S, Sunnyvale; M. Zafar Ullah, San Jose, both of Calif.

[73] Assignee: National Semiconductor Corporation, Santa Clara, Calif.

[21] Appl. No.: 302,602

[22] Filed: Sep. 8, 1994

[51] Int. Cl.$^6$ .................................................. H01M 10/46
[52] U.S. Cl. ............................... 320/5; 320/35; 320/39
[58] Field of Search .................................. 320/5, 20, 39, 320/35, 31

[56] References Cited

U.S. PATENT DOCUMENTS

| | | | |
|---|---|---|---|
| 5,187,425 | 2/1993 | Tanikawa | 320/35 X |
| 5,416,702 | 5/1995 | Kittagawa et al. | 364/424.05 |

FOREIGN PATENT DOCUMENTS

| | | |
|---|---|---|
| 5-244729 | 9/1993 | Japan . |
| 6-245403 | 9/1994 | Japan . |

OTHER PUBLICATIONS

Yung et al., "A MicroController-based Battery Charger Using Neural-Fuzzy Technology" IEE 1994, Hong Kong.

E. Khan, "Neural Network Based Algorithms for Rule Evaluation & Defuzzification in Fuzzy Logic Design," of National Semiconductor Corporation, Embedded Systems Division, 8 pages in length.

E. Khan & P. Venkatapuram, "Neufuz: Neural Network Based Fuzzy Logic Design Algorithms," of National Semiconductor Corporation, Embedded Systems Division, *FUZ-IEEE93*, Mar. 28–Apr. 1, 1993, San Francisco, CA, 8 pages in length.

E. Khan & P. Venkatapuram, "Fuzzy Logic Design Algorithms Using Neural Net Based Learning," of National Semiconductor Corporation, Embedded Systems Division, Presented at the Embedded Systems Conference, Santa Clara, Sep. 1992, 7 pages in length.

J.A. Schofield, "Batteries keep up with portable electronics," *Design News*, Oct. 24, 1994, pp. 25–26.

G. Cummings, D. Brotto & J. Goodhart, "Charge batteries safely in 15 minutes by detecting voltage inflection points," EDN, Sep. 1, 1994, pp. 89–92 & 94.

*Primary Examiner*—Edward Tso
*Attorney, Agent, or Firm*—Limbach & Limbach L.L.P.

[57] ABSTRACT

A method and apparatus for providing fast charging of secondary cells in an electronic device. The charging process is under the control of a microcontroller which contains a read-only-memory (ROM) in which is embedded code which determines the charging method. The charge method controls the charge provided to a battery back by a variable current source. An intelligent control scheme based on a neural network fuzzy logic methodology is used to optimize the charging current in response to measured characteristics of the battery.

6 Claims, 12 Drawing Sheets

METHOD AND APPARATUS FOR FAST BATTERY CHARGING USING NEURAL NETWORK FUZZY LOGIC BASED CONTROL

TECHNICAL FIELD

The present invention relates to battery chargers for secondary cells used as batteries in electronic devices, and more specifically, to a method and apparatus for fast charging of such cells which uses a neural network fuzzy logic based control scheme to tailor the operation of the charging device to specific battery chemistries.

BACKGROUND OF THE INVENTION

Fast charging of secondary cells is a problem which is difficult and often expensive to solve using conventional techniques. Most conventional fast charging techniques rely on a trip-point based approach, which subjects the secondary cells to undue thermal and chemical stress and can reduce the life of the cell. Most conventional techniques also result in overcharging the battery, which wastes energy and reduces battery life.

A multitude of fast charging schemes are currently used to quick-charge batteries. The most commonly used fast charge control schemes are: 1) a constant-rate fast charge with trip points; and 2) a multiple rate fast charge with trip points. In the first method, a high current (charge rate$\leq$1 C, where this is defined as meaning that if the battery is charged at the rate C for one hour, it will be fully charged) constant charging rate is maintained until one or more of the measured parameters exceeds the safe limits (this defines a trip point). When such a condition is detected, the charging level is reduced to a safe level. This is continued until the battery is fully charged. This approach is easy to implement, but does not achieve the fast charge times desired for some applications.

In the second method, the charger is capable of charging the battery at multiple rates, and the transition between the various charging rates is based on several trip points. These trip points are resident in firmware and are activated based on the measured battery parameters, and result in a change in the charging levels. This continues until the battery is fully charged. This type of charge control scheme is preferred for many applications, however, only about 50 trip points can be accommodated in 2.1 Kbytes of ROM. This memory requirement limits the complexity of the charging scheme which can be implemented. In addition, an elaborate scheme is required to check for the activation of the trip points and to determine the charge level desired.

FIG. 1 shows a block diagram of a conventional fast charger 50 for charging secondary batteries. Fast charger 50 includes a microcontroller 60 which contains firmware or software code which controls the charging process of battery pack 62. Serial analog-to-digital (A/D) converter 64 acquires data concerning the state of battery pack 62 during the charging process. This data typically consists of voltage, current, and temperature data which may be provided by a sensor, such as temperature sensor 66. Current sense resistor 67 is used as a sensor to provide a measure of the current flowing into or out of battery 62. The current flow is directly proportional to the voltage drop across resistor 67, which is usually selected to be of the order of 50 milli-ohms so as to minimize the power dissipated by the resistor. Historical data concerning the maximum and minimum voltage, current and temperature of battery pack 62 may be recorded in EEPROM 68. This capability is not required for stand alone battery chargers, but may be a desireable feature for a charger dedicated to charging a single battery pack. Information concerning the number of charge/discharge cycles and other data relevant to the charging process (such as manufacturer's specifications, etc.) may also be stored in EEPROM 68. Current for charging battery pack 62 is supplied by fixed current source 70, whose relative on/off state (duty cycle) may be varied to provide varying effective levels of charge per unit time. An unregulated DC source (not shown) provides the input to current source 70. A serial communication link 72 under the control of a serial communication link driver 74 provides a host with information on the charge status, historical battery parameters, and present charge level of battery pack 62.

In operation, microcontroller 60 of fast charger 50 controls the current output by current source 70 by means of a control line 76. Control line 76 causes current source 70 to be in either an on or off state according to the signal received. By modulating the on/off operation of current source 70, different amounts of charge per unit time are delivered to battery pack 62. Microcontroller 60 determines what current level (in charge per unit time) to instruct current source 70 to output based on the battery pack data acquired by serial A/D converter 64 or retrieved from EEPROM 68, and a charge control program resident in firmware contained in microcontroller 60. Control may also be based on a software program running on microcontroller 60. The firmware or software implements the fast charging scheme by comparing the measured battery pack parameters to a set of predetermined limits, i.e., the trip points. When a measured characteristic of battery pack 62 exceeds a predetermined trip point, microcontroller 60 instructs current source 70 to change the current level it is supplying to battery pack 62, in accordance with the firmware or software resident in microcontroller 60. Alteration of the charging process usually depends on the occurrence of one or more indicia which are programmed into microcontroller 60. These indicia can include a specified magnitude change in battery pack temperature over a specified time, a change in battery pack voltage over a change in time, a set magnitude of voltage decrease below a peak voltage, a maximum value of the battery pack voltage, a maximum value of the battery pack temperature, or a maximum charging time. One or more of these indicia may be used to either terminate the entire charging process or to modulate the current level in conformance with the recommended battery charging characteristics.

Battery chemistries are changing rapidly, and each battery chemistry results in different battery characteristics. This creates the need for a charging method which can be tailored to each specific battery chemistry, so as to obtain an optimal fast charging method for each type of battery. The problem can be viewed as one of devising a control scheme to be implemented by a controller which can be used to determine an optimal fast charge scheme for batteries having a variety of characteristics.

One type of control system which has found wide utility in complex electronic systems is termed an "intelligent controller". An intelligent controller has the ability to perform a desired control action under all possible combinations of input conditions, and the capability to proactively control the process of concern by predicting its behavior. An example of an intelligent controller is one based on proportional integral derivative controls which use a mathematical model of the system in the form of a differential equation to predict its behavior. Intelligent controllers are being called upon more frequently for use in assisting or use as servomechanism controllers. Further applications include control systems for robotic mechanisms.

One type of intelligent controller seeing increased use and wider application uses "approximate reasoning", and in particular, fuzzy logic. Fuzzy logic, initially developed in the 1960s (see L. A. Zadeh et al., "Fuzzy Sets and Applications", Selected Papers of L. A. Zadeh, by R. R. Yager, S. Ouchinnikov et al. (Eds.), John Wiley & Sons, 1987), has proven to be very successful in solving problems in many control applications where conventional model-based (mathematical modeling of the system to be controlled) approaches are very difficult, inefficient or costly to implement.

Fuzzy logic systems represent input/output relationships by membership functions and fuzzy rules. A membership function enables a numerical input to be expressed as a fuzzy logic variable, using linguistic terms for approximated labels or categories. Membership functions define the degree to which a particular input belongs to a fuzzy set, where the set is defined by a linguistic term. The relationships between the input and output variables are then expressed using a set of fuzzy logic rules. The control output is calculated by combining the weighted output of the rules, based on the input to the system.

An intelligent controller based upon fuzzy logic design has several advantages including simplicity and ease of design. However, fuzzy logic design does have a number of disadvantages as well. As the control system complexity increases, it quickly becomes more difficult to determine the right set of rules and membership functions to accurately describe system behavior. Further, a significant amount of time is needed to properly "tune" the membership functions and adjust the rules before an accurate solution can be obtained. Indeed, for many complex systems, it may even be impossible to arrive at a satisfactory set of rules and membership functions. Moreover, once the rules have been determined, they remain fixed within the fuzzy logic controller, i.e. the controller cannot be modified or "learn" based upon its experience (except adaptive fuzzy logic systems which do allow some limited adaptation capabilities).

The application of neural networks to learn system behavior has been suggested to overcome some of the problems associated with fuzzy logic based designs. Using a system's input and output data, a neural network can learn the system behavior and, accordingly, generate fuzzy logic rules. See: B. Kosko, "Neural Nets and Fuzzy Systems", Prentice Hall 1992; J. Nie et al., "Fuzzy Reasoning Implemented By Neural Networks", Proceedings of IJCNN92 (International Joint Conference on Neural Networks, June 1992), pp. II702–07; and J. Buckley et at., "On the Equivalent of Neural Networks and Fuzzy Logic", Proceedings of IJCNN92, pp. II691–95.

A neural network mimics human learning instead of using fixed, preprogrammed approximate reasoning or rules. Also, like fuzzy logic, it uses numerical techniques. In a neural network, many simple processing elements are interconnected by variable connection strengths (weights) and the network learns by appropriately varying those connection strengths. A neural network is primarily a data driven system which does not rely heavily upon programming. By proper learning, the neural network can develop good generalization capabilities, and therefore, solve many control problems that would otherwise go unsolved or be inefficiently solved by existing techniques.

However, a neural network may not always be the most effective way to implement an intelligent controller, since implementation of a neural network is more costly compared to fuzzy logic implementations. Fuzzy logic may be more effective for a particular application and, by proper programming, a conventional embedded controller can be used to implement the fuzzy logic. A neural network implementation by programming of the conventional embedded controller is also possible, but it will typically be significantly slower and impose considerable memory requirements. Furthermore, a dedicated hardware implementation, which is generally more desirable, is more easily constructed for fuzzy logic systems than for a neural network, and may be more cost effective when considering the relative costs of each.

By combining fuzzy logic and neural network approaches to design a control system, several valuable benefits can be obtained. The resulting solution is robust in that an invalid input can still result in a reasonable output value. This means that the system exhibits a high degree of immunity to noisy inputs. In addition, such a design methodology can provide solutions for complex nonlinear systems in a cost efficient manner. Finally, adaptive system control can be performed in a more efficient manner by combining the two techniques.

Accordingly, it would be desirable to have a method and apparatus for fast charging of secondary cells which utilizes an intelligent controller to provide an optimal charging scheme for a variety of battery chemistries. It would also be desirable for the intelligent controller to incorporate some of the benefits which can be obtained by using fuzzy logic and/or neural network based control systems.

SUMMARY OF THE INVENTION

The present invention is directed to a method and apparatus for providing fast charging of secondary cells in an electronic device. The charging process is under the control of a microcontroller which contains a read-only-memory (ROM) in which is embedded code which determines the charging method. The charge method controls the charge provided to a battery back by a variable current source. An intelligent control scheme design based on a neural network fuzzy logic methodology is used to optimize the charging current in response to measured characteristics of the battery.

Further objects and advantages of the present invention will become apparent from the following detailed description and accompanying drawings.

DETAILED DESCRIPTION OF THE PREFERRED EMBODIMENT

Figure 2:
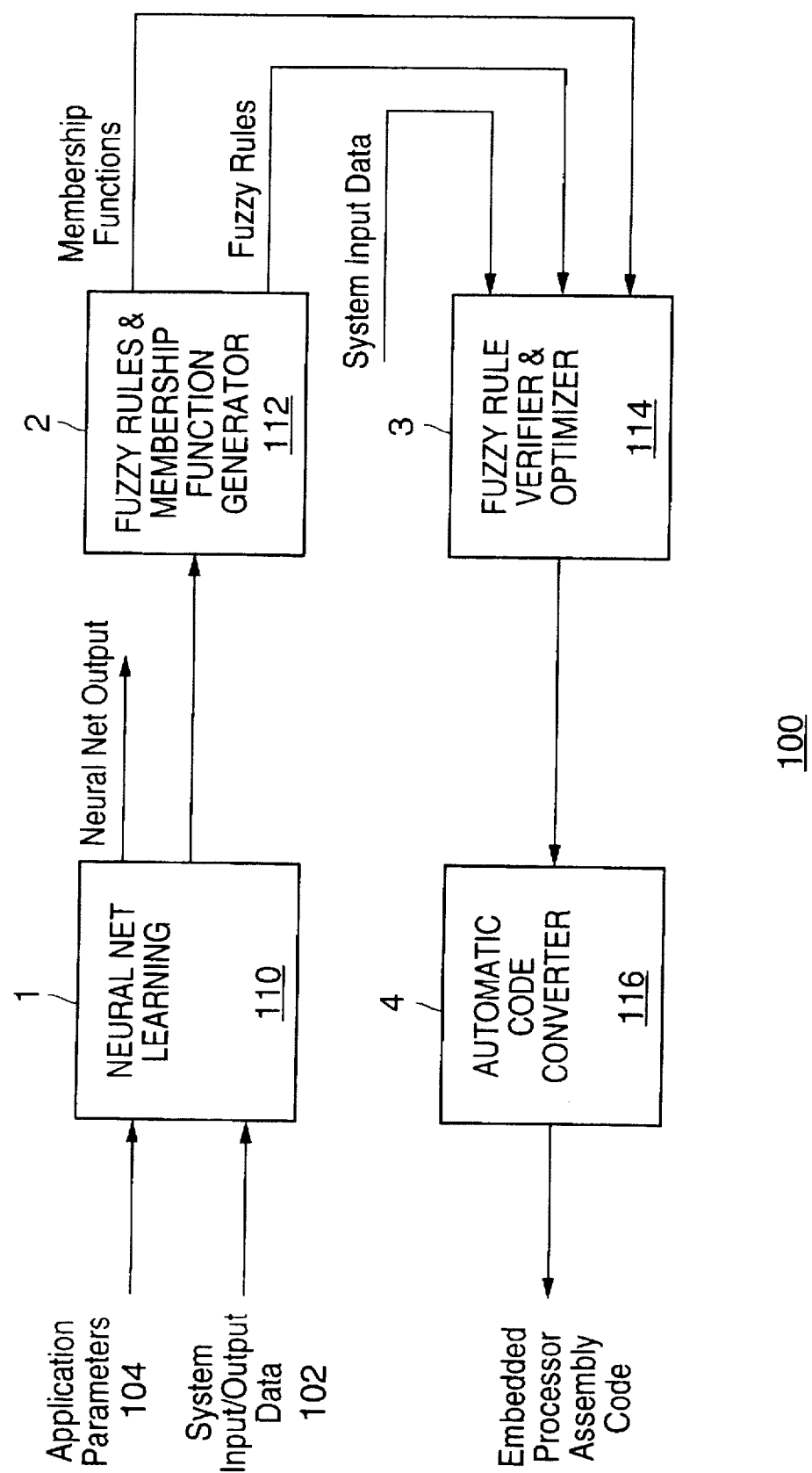
FIG. 2 is a block diagram of the primary functional components of a neural network fuzzy logic based design system used to generate the control scheme for the fast battery charger of the present invention.

FIG. 2 is a block diagram of the primary functional components of the neural network fuzzy logic based design system 100 used to generate the control scheme for the fast battery charger of the present invention. Design system 100 is based on the NeuFuz™ intelligent controller development system described in U.S. patent application Ser. No. 08,036, 634, filed Mar. 24, 1993, entitled "Fuzzy Logic Design Generator Using a Neural Network to Generate Fuzzy Logic Rules and Membership Functions for Use in Intelligent Systems". This application is assigned to National Semiconductor Corporation of Santa Clara, Calif., the assignee of the present application, and is hereby incorporated by reference.

Design system 100 consists of four basic functional units which combine a neural network with fuzzy logic concepts to generate fuzzy logic rules and membership functions. The system also provides neural network based fuzzy antecedent processing, rule evaluation and defuzzification processes.

In design system 100, a neural network is used to both learn the behavior of the system which it is desired to control, and as a fuzzy rule generator to generate a set of fuzzy logic rules and membership functions to be used in the controller which will control the system. Typically, a multilayered feed-forward neural network, based upon a modified version of a back-propagation neural network, is used to learn the system behavior using input and output data, and then map the acquired knowledge into a new non-heuristic fuzzy logic system. Interlayer weights of the neural network used in design system 100 are automatically mapped into fuzzy logic rules and membership functions.

Antecedent processing is performed according to a weighted product, or multiplication, of the membership value of the antecedents, rather than using their minimum value as is commonly done with neural networks. Neural network based algorithms are used for performing rule evaluation and defuzzification, and are typically performed in one layer of the neural network, or in one step of the neural network operation.

The first stage in the process involves providing a training set of input/output relationships 102 to a neural network learning module 110. The set of input/output relationships 102 describe the performance or behavior of the system which will be controlled. A set of neural network training parameters 104 which control the learning process and determine the speed and accuracy of the neural network's convergence to the set of weights which produces the training set (within the applicable constraints) is also input to neural network learning module 110. As will be described in greater detail, in the process of determining the connection weights which describe the neural network model after "learning" the desired system, neural network learning module 110 and fuzzy rules and membership functions generator 112 act together to convert the learned behavior into its corresponding fuzzy logic representation.

The outputs of generator 112 are the fuzzy logic rules and membership functions which represent the result of neural network module 110 learning the system for which an intelligent controller is desired. These outputs are then verified by comparison to the neural network outputs by fuzzy rule verifier and optimizer module 114. Verifier module 114 compares how close the fuzzy logic model is to the neural network outputs and determines the error introduced by any approximations made in producing the fuzzy logic rules and membership functions. The components of the fuzzy logic model may also be edited to remove marginal rules or to modify the membership functions so as to produce a better fuzzy logic model of the neural network outputs by using verifier module 114. This serves to optimize the fuzzy logic rules and membership functions and provide a better model of the neural network outputs. The optimized set of fuzzy logic model parameters is then used by code converter module 116 to automatically generate the assembly language or other code for a fuzzy logic engine which will emulate the system described by the input/output data 102 originally fed into neural network module 110. The code can be embedded in a processor or controller which will then serve as an intelligent controller for the system or application of interest.

Figure 3:
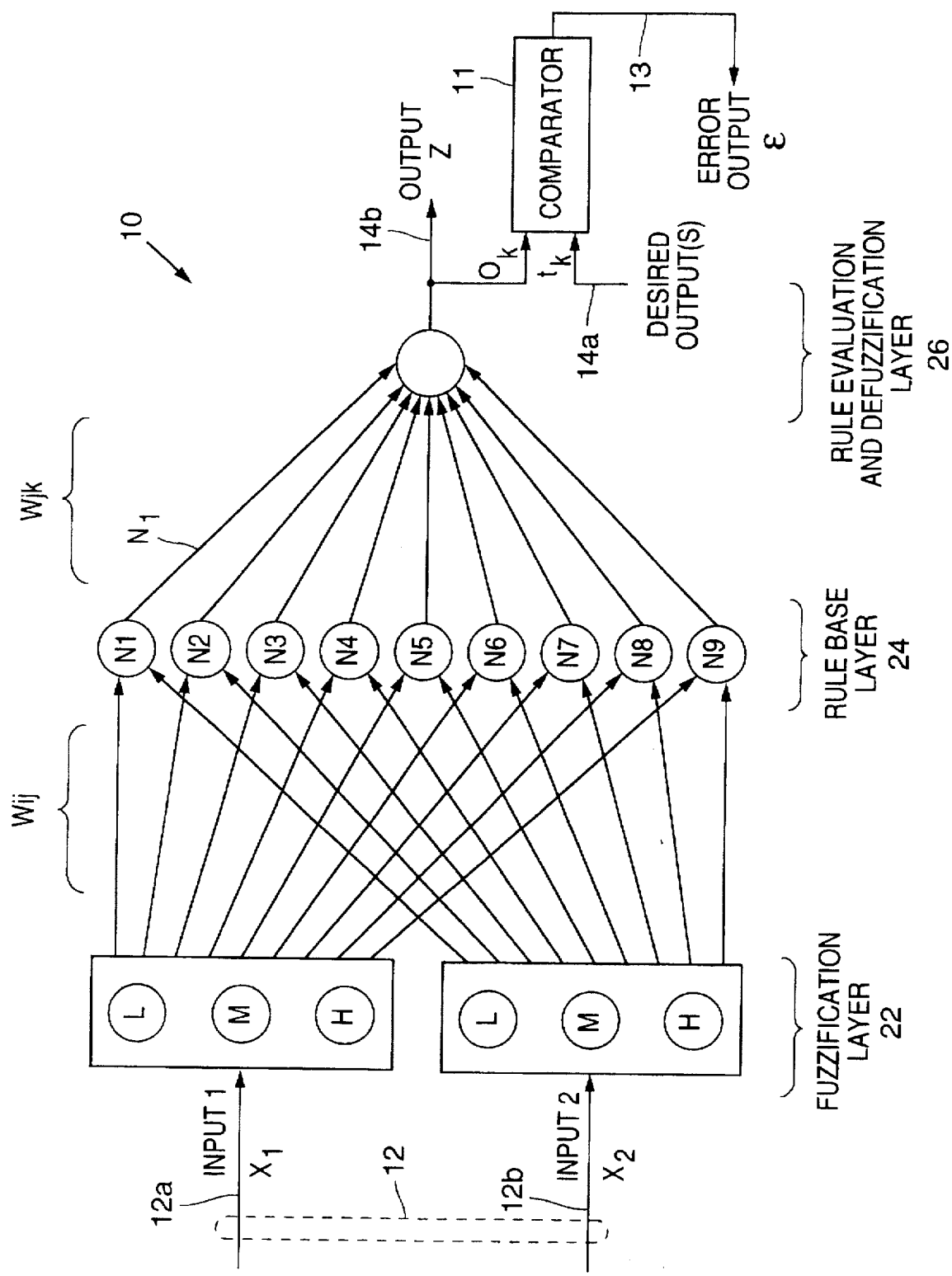
FIG. 3 illustrates an example of a neural network for generating fuzzy logic rules and membership functions used to control the fast battery charger of the present invention.

In the current implementation of the NeuFuz™ methodology, neural network learning module 110 and fuzzy rule and membership function generating module 112 are combined into one functional unit. The inputs to this unit are the input/output or pattern data characterizing the behavior of the system to be controlled, and the outputs are the fuzzy rules and membership functions. The combined neural network learning module and fuzzy rule generator takes the form of a multi-layered feedforward neural network. An example of such a learning module and rule generator is shown in shown in FIG. 3, which depicts a three layer neural network 10 for learning the behavior and generating fuzzy logic rules and membership functions of a two-input, one-output system. It should be understood that FIG. 3 depicts only one example of a neural network suitable for generating fuzzy logic rules and membership functions, and that learning mechanisms using neural networks with more than three layers for generating the rules and membership functions for systems with other than two inputs or one output are possible. Neural network 10 includes a comparator 11 and three neuron layers: (1) a fuzzification layer 22; (2) a rule base layer 24; and (3) a rule evaluation and defuzzification layer 26.

As with most neural networks, neural network 10 is trained to model the system of interest by varying the weights between the neural layers, represented as $W_{ij}$ and $W_{jk}$ in FIG. 3. However, neural network 10 differs in that the outputs of the learning process represent the fuzzy logic rules and membership functions. The first, or input, layer 22 begins the process of learning the system behavior and performs the fuzzification step in which input data 12 is mapped into the labels used in the fuzzy logic control rule, i.e., the values of the input signals $X_1$, $X_2$ ($12a$, $12b$) are matched against the labels used by a fuzzy control rule. For the example of FIG. 3, the fuzzy control rules represent relative input signal amplitudes which are classified as low ("L"), medium ("M") or high ("H"). The fuzzification layer 22 neurons and the weights $W_{ij}$ between that layer and rule base layer 24 are also used to define the input membership functions. The middle, or rule base, layer 24 (neurons N1 through N9) represents the fuzzy logic rule base. Rule base neurons N1 through N9 are characterized by linear functions which perform multiplication, rather than summation, and have slopes of unity. Linear neurons whose functions also have slopes of unity are used for the output (rule evaluation and defuzzification) layer 26 neuron. The actual output 14b of output neuron 26 is compared against a desired output(s) 14a by comparator 11, with the resulting error 13 ($\epsilon$) being used in the neural network's learning process.

Based upon these definitions, the equivalent error $\epsilon_k$ at the input of output layer 26 can be computed as follows:

$$\epsilon_k = (t_k - o_k) f_k' \quad (1)$$

where:
$\epsilon_k$=equivalent error at the input of the output layer neuron;
$f_k'$=first derivative of the function of the output layer neuron;
$t^k$=desired output of the output layer neuron; and
$o_k$=actual output of the output layer neuron.

Once the equivalent error $\epsilon_k$ has been computed, the middle-to-output layer weights $W_{jk}$ are modified, or updated as follows:

$$W_{jk}(\text{new}) = W_{jk}(\text{old}) + \eta \epsilon_k o_j \quad (2)$$

where:
$W_{jk}(\text{new})$=updated weight between middle (hidden) layer neuron j and output layer neuron k;
$W_{jk}(\text{old})$=original weight between middle (hidden) layer neuron j and output layer neuron k;
$\eta$=learning rate;
$\epsilon_k$=equivalent error at the input of the output layer neuron; and
$o_j$=actual output of the hidden layer neuron.

Further discussion of the interlayer weight modification process can be found in the commonly assigned U.S. patent application Ser. No. 07/859,328, entitled "Intelligent Controller With Neural Network and Reinforcement Learning", the disclosure of which is incorporated herein by reference.

The equivalent error $\epsilon_j$ at the input to the middle, or hidden, layer neurons N1 through N9 can be computed according to known back-propagation modeling techniques as follows:

$$\epsilon_j = f_j' \sum_k \epsilon_k W_{jk} \quad (3)$$

where:
$\epsilon_k$=equivalent error at the input of the output layer neuron;
$\epsilon_j$=equivalent error at the input of middle (hidden) layer j; and
$f_j'$=first derivative of the function of the middle (hidden) layer neuron j.

Further discussion of this back-propagation modeling technique can be found in the commonly assigned U.S. patent application Ser. No. 07/967,992, entitled "Intelligent Servomechanism Controller Using a Neural Network", the disclosure of which is incorporated herein by reference.

However, because as noted above, the middle, i.e. rule base, layer neurons N1 through N9 use multiplication instead of summation, the equivalent error at the input to the middle layer neurons depends upon the derivative of $f_j$, where $f_j$ is computed as follows:

$$f_j = \prod_i W_{ij} o_i \quad (4)$$

where:
$f_j$=function describing the operation of the middle (hidden) layer neuron;
$W_{ij}$=weight between input layer neuron i and middle (hidden) layer neuron j;
$o_i$=output of input neuron i.

Accordingly, the equivalent error $\epsilon_i$ at the input to the fuzzification layer 22 is computed as follows:

$$\epsilon_i = f_i' \sum_j \epsilon_j W_{ij} \sum_{i, i \neq m} W_{mj} o_m \quad (5)$$

where:
$\epsilon_i$=equivalent error at the input of input layer i;
$f_i'$=first derivative of the function of input layer neuron i;
$\epsilon_j$=equivalent error at the input of middle (hidden) layer j;
$W_{ij}$=weight between input layer neuron i and middle (hidden) layer neuron j;
$W_{mj}$=weight between input layer neuron m and middle (hidden) layer neuron j;
$o_m$=output of input neuron m.

The input-to-middle layer weights $W_{ij}$ can then be modified, or updated, as needed using an equation similar to equation (2) above, with appropriate substitutions for the corresponding equivalent error ($\epsilon_n$) and output ($o_n$) signals. In order to generate membership functions of different shapes, input layer 22 can be replaced with multiple layers of suitable type neurons. An example of such a multi-layer fuzzification layer will be discussed later in this application. The weight modification equations discussed previously will accordingly be altered to reflect the additional neuron layers.

As seen in FIG. 3, the inputs to the middle layer neurons N1 through N9 are the preconditions, or antecedents, of the rules, and the outputs are the conclusions, or consequents. Accordingly, rule base layer neuron N1 can be interpreted as representing the rule that "if input $X_1$ is low and input $X_2$ is low, then the output is N1", wherein N1 can be used to represent the fuzzy conclusion from rule number one.

As noted above, and as is evident from Equation (4), the antecedent processing of the present invention uses a multiplication operation, rather than a "minimum" operation as is used in conventional fuzzy logic design. This means that the signals representing the antecedents are multiplied within the rule base layer neurons N1 through N9, rather than summed and compared to a threshold, or minimum, reference value. For a two-input, one-output learning mechanism as shown in FIG. 3, if three membership functions are used, a maximum of $3^2=9$ rules is needed. Therefore, in this example nine middle, or rule base, layer neurons are needed. The output layer neuron 26, performs the rule evaluation and defuzzification.

To help expedite the learning process and convergence of the neural network, the neural network which produces the fuzzy rules and membership functions is first initialized with some suitable values of the interlayer weights $W_{ij}$, $W_{jk}$. Following that, a set of input and desired output data is applied for several cycles to allow the neural network to converge. At that point, the generated fuzzy logic rules and membership functions can be extracted. The inputs should be selected so as to cover the entire potential input range well. This will result in better learning, and therefore, a better set of fuzzy logic rules and membership functions. Also, the learning rates used for modifying the interlayer weights should be selected so that the neural network does not oscillate and converges to a good local minima.

As previously discussed, if it is desired to generate membership functions of different shapes, fuzzification layer 22 of FIG. 3 can be constructed of multiple layers of various types of neurons, including combinations of linear and nonlinear function neurons. In this case, the weight modification equations (equations (1) through (5) above) will also be modified to account for these additional layers of neurons that generate the membership functions.

Figure 4:
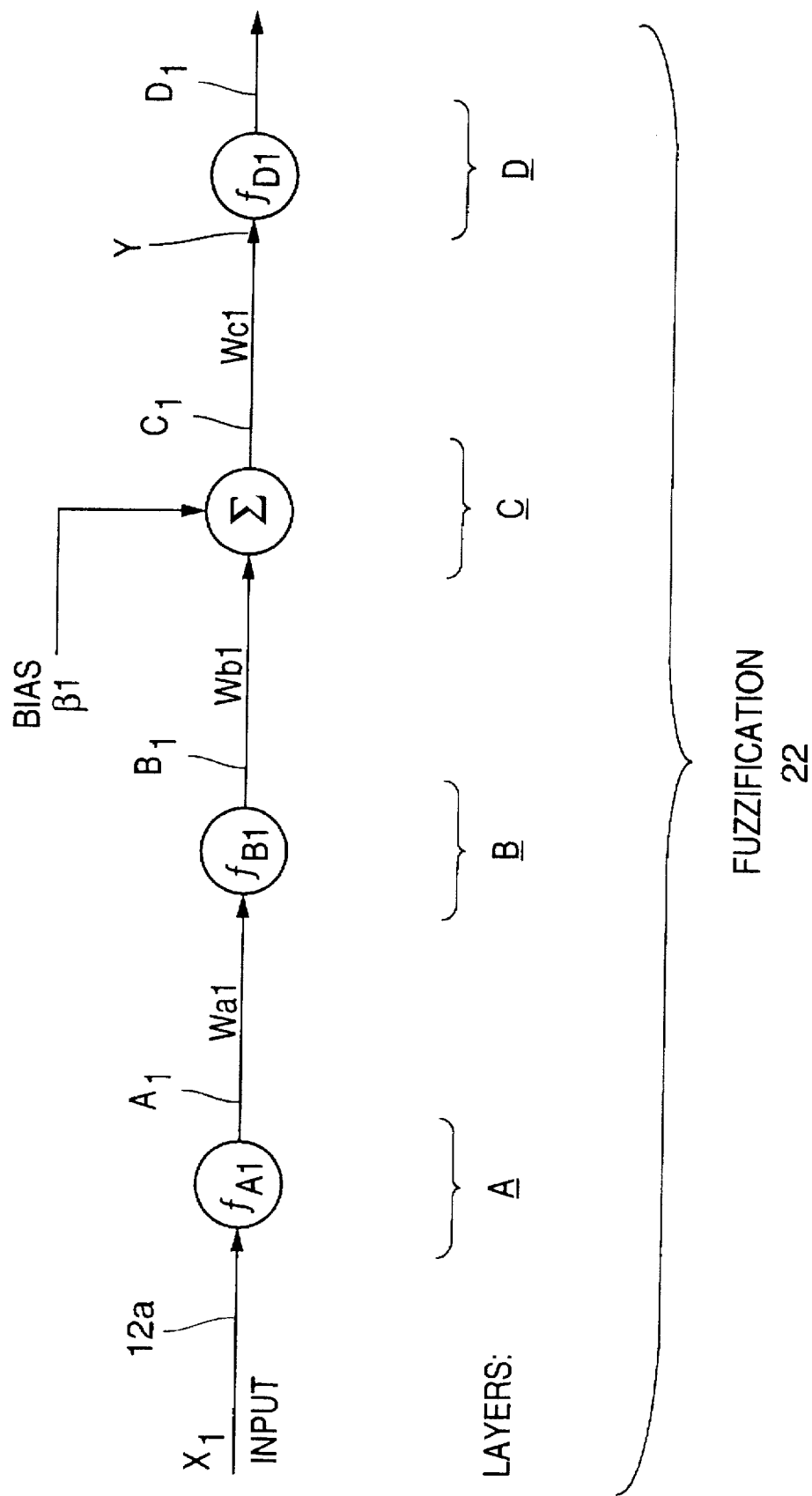
FIG. 4 illustrates an exemplary portion of the fuzzification layer of the neural network illustrated in FIG. 3.

For example, referring to FIG. 4, the fuzzification layer 22 of the learning mechanism neural network of FIG. 3 can be constructed of four layers A, B, C, D of neurons. For the sake of simplicity, only one signal path for input $X_1$ (12a) is shown. It should be understood that, depending upon how many membership functions are used for each input, additional signal paths may be required.

The input signal $X_1$ is processed by layer A and B neurons whose functions are $f_{A1}$ and $f_{B1}$, respectively. Their outputs $A_1$ and $B_1$ are weighted by the interlayer weights $W_{a1}$ and $W_{b1}$, respectively, with the result (i.e. the multiplication product $X_1 f_{A1} W_{a1} f_{B1} W_{b1}$) being summed in layer C with a bias signal $\beta_1$. The sum output $C_1$, weighted by interlayer weight $W_{c1}$, forms the input signal Y for the layer D neuron, whose nonlinear function $f_{D1}$ produces the output signal $D_1$ which goes to neuron N1 of the rule base layer 24 of FIG. 3. Mathematically, this signal path can be represented as follows:

$$y = (X_1 f_{A1} W_{A1} f_{B1} W_{b1} + \beta_1) W_{c1} \qquad (6)$$

where:

$X_1$=first input;
$f_{A1}$=first layer neuron function;
$W_{A1}$=weight between the first and second layer neurons;
$f_{B1}$=second layer neuron function;
$W_{b1}$=weight between the second and third layer neurons;
$\beta_1$=bias signal; and
$W_{c1}$=weight between the third and fourth layer neurons.

The neural functions $f_{A1}$ and $f_{B1}$ of layers A and B can be kept constant, e.g. as linear gain functions, with the interlayer weights $W_{a1}$, $W_{b1}$ and $W_{c1}$ being modified during the learning process. If the nonlinear function $f_{D1}$ of layer D is an exponential function (e.g. of the form $1/[1+e^{-y}]$), then the output $D_1$ can be expressed as follows:

$$\begin{aligned} D_1 &= f_D = 1/(1 + e^{-y}) \qquad (7) \\ &= (1 + \exp[-y])^{-1} \\ &= (1 + \exp[-(X_1 f_{A1} W_{A1} f_{B1} W_{b1} + \beta_1) W_{c1}])^{-1} \end{aligned}$$

During the learning process, as weights $W_{a1}$, $W_{b1}$, and $W_{c1}$ are modified, an exponential membership function can be established. As will be recognized from Equation (7) above, the size and shape of this membership function is determined by the weights $W_{a1}$, $W_{b1}$ and $W_{c1}$, and the bias $\beta_1$. Accordingly, by using different initial values of weights and biases among the various input signal paths, various exponential membership functions of the same type, but with different shapes, sizes and positions, can be generated. For example, by using multiple neurons in layers C and D, and using different weight values for their input weights $W_{b1}$ and $W_{c1}$, any class of exponential type membership function can be generated. Such membership functions would meet the criteria necessary to back-propagate error signals. However, it should be understood that other suitable mathematical functions such as $(1-e^{-y})/(1+e^{-y})$ can be used as well.

After these membership functions have been generated, the weights $W_{a1}$, $W_{b1}$, $W_{c1}$ remain fixed, and a neural network recall operation will act to classify the input $X_1$ into one or more fuzzy logic classes (where each neuron in layer D defines a fuzzy logic class). To perform the recall operation, the input pattern $\vec{X}$, or vector, is applied to the input layer and propagated through the network without modifying the interlayer weights.

The AND operation of the membership function noted above is performed as a multiplication operation. Therefore, the antecedent processing is performed according to:

$$v_c = v_a v_b \qquad (8)$$

where:

$v_c$=membership function of the combination of membership functions $v_a$ and $v_b$;
$v_a$=membership function of input A; and
$v_b$=membership function of input B.

This use of multiplication, which is dictated by the use of a neural network, produces significantly improved results over those obtained using a "minimum" operation for processing the antecedents. Since the antecedent processing, and the rule evaluation and defuzzification performed by neuron layer 26 are all based on neural network learning, use of a "minimum" operation instead of a multiplication operation produces significant errors. Examples of the errors encountered can be seen by referring to Table 1 below, which clearly indicates the reduced error which can be obtained by using a multiplication operation instead of a minimum operation.

TABLE 1

| INPUT 1 | INPUT 2 | MINIMUM | MULTIPLICATION |
|---------|---------|---------|----------------|
| 1.0 | 1.0 | 1.0 | 1.0 |
| 0.9 | 0.9 | 0.9 | 0.81 |
| 0.8 | 0.8 | 0.8 | 0.64 |
| 0.7 | 0.7 | 0.7 | 0.49 |
| 0.6 | 0.6 | 0.6 | 0.36 |
| 0.5 | 0.5 | 0.5 | 0.25 |
| 0.4 | 0.4 | 0.4 | 0.16 |
| 0.3 | 0.3 | 0.3 | 0.09 |
| 0.2 | 0.2 | 0.2 | 0.04 |
| 0.1 | 0.1 | 0.1 | 0.01 |

Figure 5:
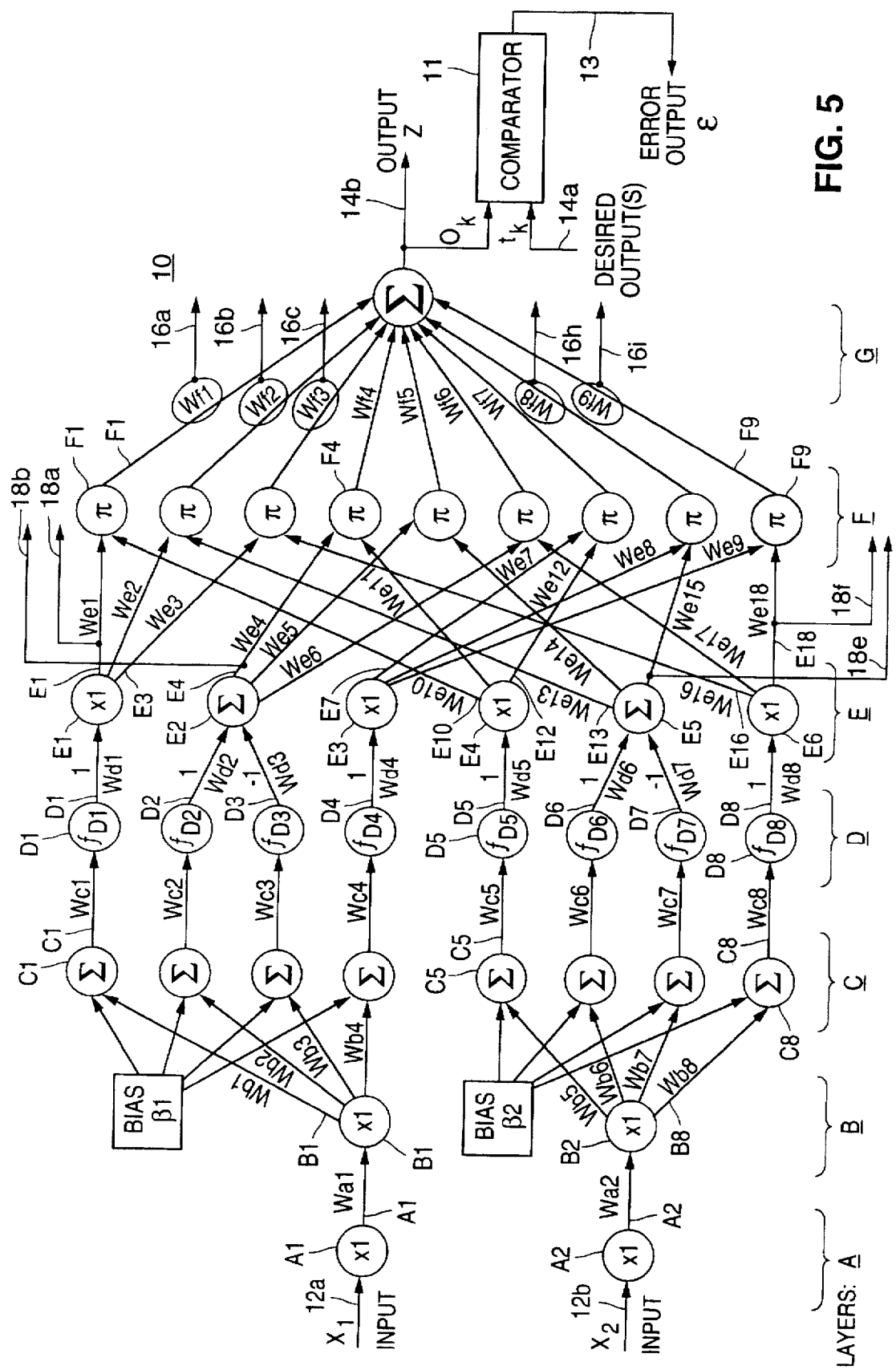
FIG. 5 illustrates another embodiment of the neural network of FIG. 3.

Referring to FIG. 5, a preferred embodiment of a two-input, one-output neural network 10 of the neural network fuzzy logic design system 100 of the present invention includes seven layers of neurons labelled layers A through G. Input signals $X_1$ and $X_2$ (12a, 12b) are received by the layer A neurons A1 and A2, which have gains of unity and produce intermediate signals $A_1$ and $A_2$, respectively. Signals $A_1$, $A_2$ are multiplied, i.e. weighted, by their respective interlayer weights $W_{a1}$ and $W_{a2}$ and received by the layer B neurons B1 and B2, which have gains of unity and produce intermediate signals $B_1$ through $B_4$ and $B_5$ through $B_8$, respectively, where $B_1=B_2=B_3=B_4$ and $B_5=B_6=B_7=B_8$.

Intermediate signals $B_1$ through $B_8$ are weighted by their respective interlayer weights $W_{b1}$ through $W_{b8}$ and received by the layer C neurons C1 through C8, which also receive the two bias signals $\beta_1$ and $\beta_2$. The layer C neurons C1 through C8 perform summation operations on these input signals ($C_1 = B_1 W_{b1} + \beta_1, C_2 = B_1 W_{b2} + \beta_1, \ldots, C_8 = B_8 W_{b8} + \beta_2$) and produce intermediate signals $C_1$ through $C_8$. Intermediate signals $C_1$ through $C_8$ are weighted by their respective interlayer weights $W_{c1}$ through $W_{c8}$ and received by the layer D neurons D1 through D8. Intermediate signals $C_1 W_{c1}, C_2 W_{c2}, \ldots, C_8 W_{c8}$ are modified in accordance with the functions $f_{D1}$ through $f_{D8}$ of the layer D neurons D1 through D8 (per the discussion of Equation (7) above) to produce intermediate signals $D_1$ through $D_8$.

Intermediate signals $D_1$ through $D_8$ are weighted by their respective interlayer weights $W_{d1}$ through $W_{d8}$ which, with the exception of weights $W_{d3}$ and $W_{d7}$, have values of unity. Weights $W_{d3}$ and $W_{d7}$ have values of negative one (−1). The resulting product signals $D_1W_{d1}, D_2W_{d2}, \ldots, D_8W_{d8}$ are received by the layer E neurons E1 through E6. Layer E neurons E1, E3, E4 and E6 have gains of unity and produce from their respective input signals $D_1W_{d1}, D_4W_{d4}, D_5W_{d5}$ and $D_8W_{d8}$, further intermediate signals $E_1$ through $E_3$, $E_7$ through $E_{12}$ and $E_{16}$ through $E_{18}$ (where $E_1=E_2=E_3$, $E_7=E_8=E_9$, $E_{10}=E_{11}=E_{12}$ and $E_{16}=E_{17}=E_{18}$). Layer E neurons E2 and E5 receive their respective input signals $D_2W_{d2}, D_3W_{d3}, D_6W_{d6}$ and $D_7W_{d7}$, perform summation operations and provide intermediate signals $E_4$ through $E_6$ and $E_{13}$ through $E_{15}$ (where $E_4=E_5=E_6$ and $E_{13}=E_{14}=E_{15}$).

The neurons of layers A through E establish the fuzzy logic membership functions 18. Membership functions 18 are determined by taking the outputs of the layer E neurons 18a ($E_1$ [or $E_2$ or $E_3$]) through 18f ($E_{18}$ [or $E_{16}$ or $E_{17}$]) with respect to the network inputs 12a ($X_1$) and 12b ($X_2$). Note that for purposes of simplification, only membership function signals 18a, 18b, 18e and 18f have been labelled in FIG. 5. Thus, membership functions 18 can be extracted for later use, e.g. by computing and storing the values of the outputs 18 versus inputs 12 functions.

The layer F neurons F1 through F9 serve as the rule base neurons and each perform multiplication, or product, operations on their respective input signals. For example, as shown, layer F neuron F1 receives and multiplies its input signals $E_1W_{e1}$ and $E_{10}W_{e10}$. Similarly, neuron F2 forms the product of its two input signals $E_2W_{e2}$ and $E_{13}W_{e13}$, and so on through neuron F9. Resulting product signals $F_1$ through $F_9$ are multiplied by their respective interlayer weights $W_{f1}$ through $W_{f9}$, with the resulting product signals $F_1W_{f1}, F_2W_{f2}, \ldots, F_9W_{f9}$ received by the layer G neuron. The layer G neuron performs a summation of all of these product signals to produce the final output signal Z. The layer G neuron serves as the fuzzy rule evaluation and defuzzification layer 26 shown in FIG. 3.

The output layer weights 16a ($W_{f1}$) through 16i ($W_{f9}$) between the layer F and G neurons form the consequents of the fuzzy logic rules 16. The antecedents for the fuzzy logic rules 16 are formed by FUZZY($E_1$) through FUZZY($E_{18}$), where the function FUZZY($E_N$) represents the value of layer E output $E_N$ (where $N \in \{1,2,3,\ldots,18\}$) based upon the input XM (where $M \in \{1,2\}$) in accordance with the membership functions (discussed above). Accordingly, a typical rule for the configuration of FIG. 5 is: "If X1 is FUZZY(E1) [e.g. "L" per FIG. 3], and X2 is FUZZY(E10) [e.g. "L" per FIG. 3], then the output is $W_{f1}$." Thus, the fuzzy logic rules 16 can be extracted for later use by storing the values of the output layer weights 16a ($W_{f1}$) through 16i ($W_{f9}$).

Figure 6:
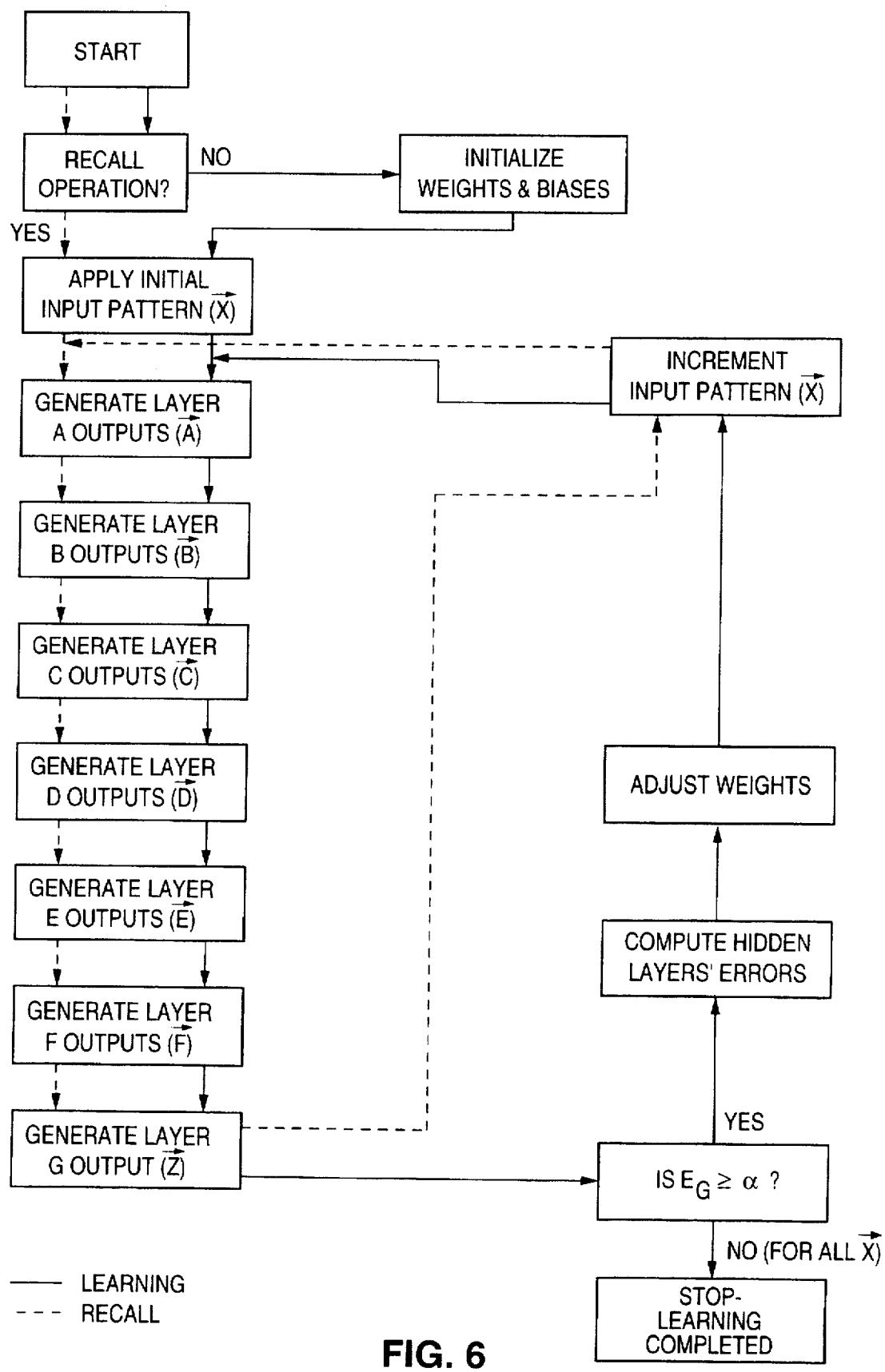
FIG. 6 is a flowchart showing the learning and recall functions of the neural network of FIG. 5.

FIG. 6 is a flowchart showing the learning and recall functions of the neural network of FIG. 5. As indicated in FIG. 6, first, the interlayer weights $\vec{W}_a, \vec{W}_b, \vec{W}_c, \vec{W}_d, \vec{W}_e$ and $\vec{W}_f$ and biases $\beta_1$ and $\beta_2$ are initialized. Then, the layer A neurons A1, A2 receive the input signals $X_1$ and $X_2$, and generate the layer A outputs $\vec{A}$. The layer B neurons B1, B2 receive their respective input signals $\vec{A}\vec{W}_a$ and generate the layer B neuron output signals $\vec{B}$. The layer C neurons C1 through C8 receive their respective input signals $\vec{B}\vec{W}_b$, $\beta_1$, $\beta_2$, and generate the layer C outputs $\vec{C}$. The layer D neurons D1 through D8 receive their respective input signals $\vec{C}\vec{W}_c$ and produce, in accordance with their respective nonlinear functions $f_{d1}$ through $f_{D8}$, the layer D outputs $\vec{D}\vec{W}_d$. The layer E neurons E1 through E6 receive their respective inputs $\vec{D}\vec{W}_d$ and generate the layer E outputs $\vec{E}$. The layer F neurons F1 through F9, the rule base neurons, receive their respective input signals $\vec{E}\vec{W}_e$ and generate the layer F outputs $\vec{F}$. The layer G neuron receives signals $\vec{F}\vec{W}_f$ and generates the layer G output Z.

In accordance with the discussion above regarding equation (1), the output error $\epsilon_G$ is then computed and compared against a selected reference, or threshold, error value $\alpha$. If the output error $\epsilon_G$ is greater than or equal to the threshold $\alpha$, the equivalent errors $\epsilon_n$ for each of the hidden layers are computed in accordance with the discussion above regarding equations (3) and (5). Following this, the interlayer weights $\vec{W}_a, \vec{W}_b, \vec{W}_c, \vec{W}_e$ and $\vec{W}_f$ are adjusted. The interlayer weights $\vec{W}_d$ are not modified, but are kept at their original values of unity or negative one [31 1].

The foregoing steps are repeated until such time as the output error $\epsilon_G$ is less than the selected threshold error $\alpha$ for all input training patterns $\vec{X}$. Once $\epsilon_G < \alpha$ for all $\vec{X}$, the learning operation is complete.

In accordance with the neural network fuzzy logic system described with reference to FIGS. 2–6, rule evaluation (fuzzy inferencing) and defuzzification are combined to form a single operation. As discussed further below, this single operation does not use any division, unlike conventional defuzzification methods such as the center of gravity (COG) method. The defuzzification method described herein saves time and is more accurate since it is based on neural network learning, the accuracy of which can be controlled during the learning process by selecting the desired error criterion. The defuzzification method is performed as follows:

$$Z = o_j p_j W_{jk} \qquad (9)$$

where:
Z=defuzzified output of neural network;
$o_j$=output of rule base layer neuron j; and
$W_{jk}$=weight between rule base layer neuron j and output layer neuron k.

The defuzzified output Z includes the contribution from all of the rules within the rule base layer of neurons and matches the behavior of the neural network. Hence, this defuzzification (e.g. "neural defuzzification") is optimal, and is easier to implement because it does not require a division operation. This is to be contrasted with the conventional COG defuzzification operation, which is defined as follows:

$$Z = (\sigma_i v_i V_i)/(\sigma_i v_i) \qquad (10)$$

where:
$v_i$=membership function i;
$V_i$=universe of discourse i; and
i=index for universe of discourse (dependent upon number of output membership functions, shape of output membership functions and application).

In COG defuzzification, the index "i" for the universe of discourse can be more than the number of rules. On the other hand, in neural defuzzification according to the method described herein, the summation index "j" is limited to the number of rules. Therefore, on the average, neural defuzzification has fewer multiplication operations, as well as having no division operation.

Neural defuzzification in accordance with the method described in this application is actually a form of rule evaluation. Since the output of the rule is a "nonfuzzy" number, actual defuzzification is not required. Therefore, the terminology neural role evaluation, rather than neural defuzzification, is also appropriate.

The implementation and operation of neural network fuzzy logic systems of the type shown in FIGS. 3–5 have been simulated with very encouraging results. By way of example, a simulation was performed involving the following highly nonlinear analog function:

$$Y = 2X_1^3 + 3X_2^2 - 1 \qquad (11)$$

where $X_2 = 2X_1$ has been used to simplify the example.

The corresponding input signal data $X_1$, $X_2$, the resulting output Y, the teaming rate $\eta$, learning factor and accuracy factor $\alpha$ used in this simulation are shown below in Table 2.

TABLE 2

Learning Rate ($\eta$) = 0.01
Learning Factor = 0.20
Accuracy Factor ($\alpha$) = 0.008

| INPUT 1 X1 | INPUT 2 X2 | OUTPUT Y |
|---|---|---|
| −2.10 | −4.20 | 33.40 |
| −1.70 | −3.40 | 23.85 |
| −1.30 | −2.60 | 14.89 |
| −0.90 | −1.80 | 7.26 |
| −0.50 | −1.00 | 1.75 |
| −0.10 | −0.20 | −0.88 |
| 0.30 | 0.60 | 0.13 |
| 0.70 | 1.40 | 5.57 |
| 1.10 | 2.20 | 16.18 |
| 1.50 | 3.00 | 32.75 |
| 1.90 | 3.80 | 56.04 |
| 2.10 | 4.20 | 70.44 |

In accordance with the foregoing discussion, the learning factor determines the learning rates within the inner layers of neurons, while the learning rate $\eta$ corresponds to the output layer only. After the neural network has converged using the applied data to an accuracy factor $\alpha$ (as indicated in Table 2) using seven input membership functions for each input, the fuzzy logic rules are generated (using the layer F neurons' outputs $F_1$ through $F_9$ and output weights $W_{f1}$ through $W_{f9}$). The resulting fuzzy logic rules for this example are shown below in Table 3.

TABLE 3

|    | LH | MH | SH | MD | SL | ML | LL |
|---|---|---|---|---|---|---|---|
| LH | 8.79 | 14.58 | 11.36 | 0.04 | 0.01 | 0.01 | 0.01 |
| MH | 14.58 | 3.62 | 9.86 | 0.20 | 0.01 | 0.01 | 0.01 |
| SH | 11.36 | 9.86 | 22.93 | 19.68 | 0.07 | 0.01 | 0.01 |
| MD | 0.04 | 0.20 | 19.68 | −1.63 | 4.46 | 0.66 | 0.07 |
| SL | 0.01 | 0.01 | 0.07 | 4.46 | 9.26 | 1.06 | 0.89 |
| ML | 0.01 | 0.01 | 0.01 | 0.66 | 1.06 | 5.89 | 11.53 |
| LL | 0.01 | 0.01 | 0.01 | 0.07 | 0.89 | 11.53 | 13.47 | where:
LH = large high
MH = medium high
SH = small high
MD = medium
SL = small low
ML = medium low
LL = large low and where "large", "medium", "small", "high" and "low" are relative qualitative parameters (e.g. fuzzy variables). As an example of the entries in the above table, if input X1 is SH and input X2 is MH, then output is 9.86.

The data shown in Table 3 are numbers, i.e. singletons, as opposed to fuzzy numbers used in conventional fuzzy logic. The shape of the input membership functions for input 1 ($X_1$) is generated by the neural network. The shape of the membership function for input 2 ($X_2$) is similar since input $X_1$ and $X_2$ are related by Equation (11) above. Accordingly, the two-input, one-output system generated $7^2 = 49$ rules. The number of rules was reduced, i.e. optimized, to 25 using a "fuzzy rule verifier" which, as discussed further below, is basically a fuzzy logic system using the above-described neural network techniques. A set of recall inputs was used along with the generated fuzzy logic rules and membership functions for both the non-optimized (49 rules) and optimized (25 rules) cases. The resulting computed outputs are shown below in Table 4.

TABLE 4

| Input 1 X1 | Input 2 X2 | Outputs (49 Rules) | Outputs (25 Rules) |
|---|---|---|---|
| −2.100 | −4.200 | 33.321 | 33.321 |
| −1.900 | −3.800 | 28.594 | 28.594 |
| −1.500 | −3.000 | 19.245 | 19.245 |
| −1.100 | −2.200 | 10.805 | 10.805 |
| −0.700 | −1.400 | 4.212 | 4.212 |
| −0.300 | −0.600 | 0.016 | 0.016 |
| 0.100 | 0.200 | −0.836 | −0.836 |
| 0.500 | 1.000 | 2.199 | 2.197 |
| 0.900 | 1.800 | 10.063 | 10.059 |
| 1.300 | 2.600 | 23.697 | 23.694 |
| 1.700 | 3.400 | 43.508 | 43.507 |
| 2.100 | 4.200 | 70.397 | 70.397 |

From the foregoing, a number of observations can be made. First, the result of the antecedent processing, rule evaluation and defuzzification using all of the possible fuzzy logic rules (i.e. all 49 rules) and membership functions generated by the described method is substantially equal to the values generated in a neural network recall operation (column 3). Further, it can be shown that using even fewer than 49 rules (e.g. 25 rules per column 4) will produce comparable results. This is advantageous in that it takes substantially less time, as well as less memory, to compute the output.

Figure 7:
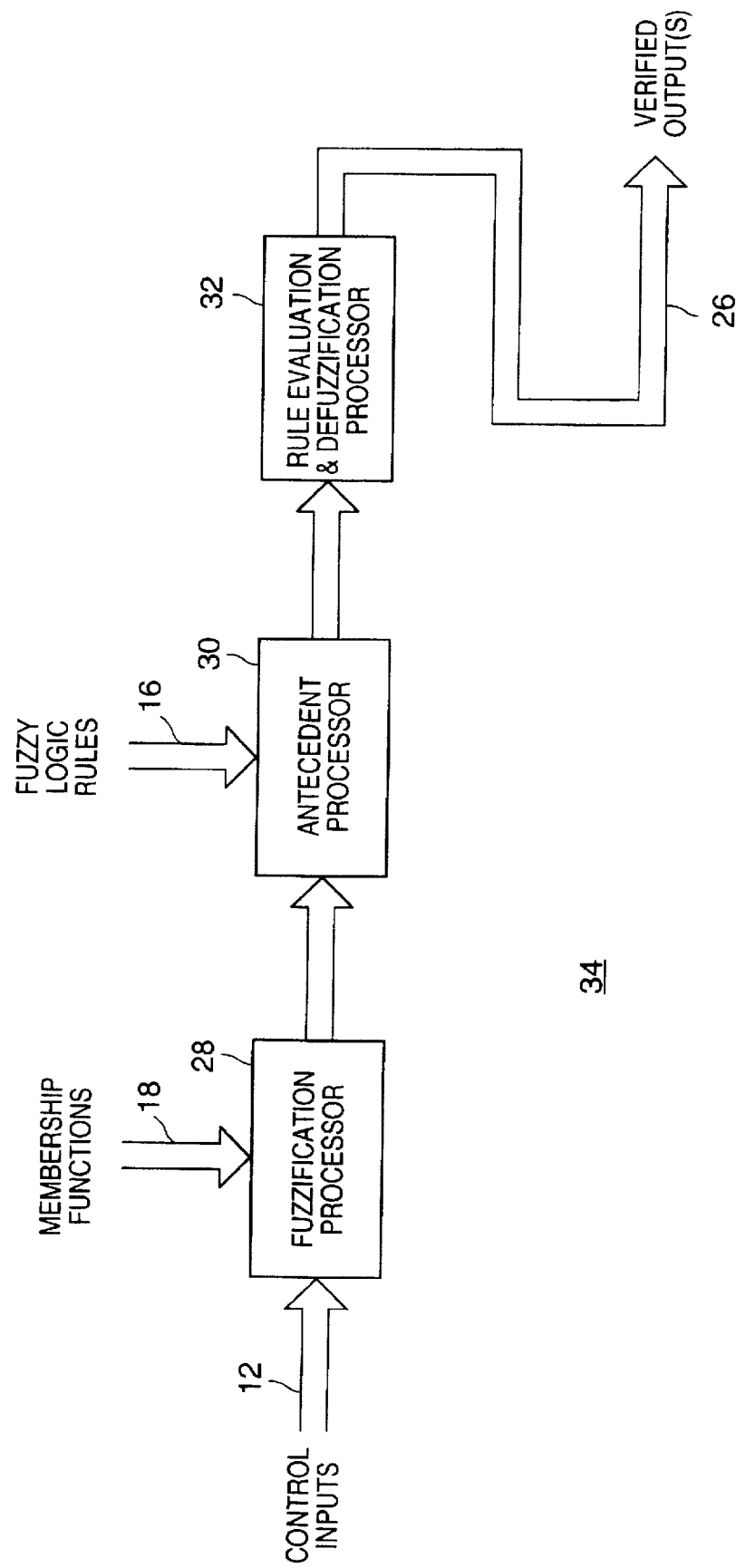
FIG. 7 shows a fuzzy rule verifier (FRV) for use with the neural network fuzzy logic design system of FIGS. 2–6 to evaluate the fuzzy logic rules and membership functions generated by that neural network.

Referring to FIG. 7, a fuzzy rule verifier 34 suitable for use with the neural network fuzzy logic design system of FIGS. 2–6 evaluates the fuzzy logic rules 16 and membership functions 18 generated by the neural network 10 of FIG. 3. The inputs to fuzzy rule verifier 34 are the fuzzy logic rules 16, membership functions 18 and inputs 12 for which the verified output needs to be computed. The fuzzification processor 28, antecedent processor 30, and rule evaluation and defuzzification processor 32 can be constructed in the form of a multilayer neural network in accordance with the discussion above regarding FIGS. 3–5. Rule evaluation and defuzzification layer 26 of FIG. 3 can serve as fuzzy rule verifier 34 of FIG. 7 in the situation where the interlayer weights of neural network 10 are fixed, so that no learning occurs.

To verify the fuzzy logic rules 16 and membership functions 18, the verified output of the fuzzy rule verifier 34 is compared with the desired outputs 14. As discussed above, some of the desired outputs are used during the initial neural network training phase. The other desired outputs can be obtained either by making additional measurements on the system to be controlled, or by performing a forward calculation on the learned neural network 10 of FIGS. 3–5. The latter operation can be done by performing a recall operation within the fuzzy rule generator 10.

Fuzzy rule verifier 34 can verify whether the computed output from the defuzzification process for a set of inputs is the same as that obtained from a recall operation through the fuzzy rule generator 10. This provides a direct check on the accuracy of the generated fuzzy logic rules 16 and membership functions 18 provided by fuzzy rule generator 10. Since fuzzy rule generator 10 has the capability to reduce the number of fuzzy logic rules methodically, a fuzzy rule verifier 34 can be used to verify whether the resulting defuzzified output using fewer fuzzy logic rules is sufficiently close to the value otherwise obtained from the recall operation. Additionally, if approximated membership functions are used, e.g. with more convenient geometric shapes, the fuzzy rule verifier 34 can be used to compute the resulting approximated defuzzified output and compare it with the output generated from the recall operation. In this manner, acceptable results can be ensured while still allowing for the use of approximated membership functions.

After the optimum number of fuzzy logic rules and membership functions has been determined (including the shapes of the membership functions) using the fuzzy rule verifier, a fuzzy logic system design can be completed. The completed design can then be implemented on a chosen processor. A conventional automated code converter can be used to take the fuzzy logic rules and the shape of the input membership functions and generate assembly code that can be executed by the chosen processor.

From the foregoing, it can be understood that the neural network fuzzy logic technique described herein advantageously combines beneficial attributes of neural networks and fuzzy logic, e.g. the adaptability, or learning capability, of the former and the simplicity of the latter. The methodology described provides a technique for applying neural network concepts to the design and implementation of fuzzy logic. Also, it provides neural network based fuzzy logic design for antecedent processing, rule evaluation (fuzzy inferencing) and defuzzification operations.

Now that the basic structure and operation of the neural network fuzzy logic design system used to produce the code which resides in the controller used to implement the fast battery charging method of the present invention has been described, additional details will be provided regarding the training data used by neural network 10 of FIG. 3. As is apparent from the preceding discussion, the selection of the input data used to train the neural network and the interconnection weights between the neuron layers has a large effect on the final code generated by automatic code converter module 116, and ultimately used to control the charging of the battery.

The general steps involved in developing the control code for the present invention are: (1) Define the data set by studying battery parameters; (2) Preprocess the data set to tailor it to the hardware; (3) Configure the neural network; (4) Train the neural network; (5) Find an optimized fuzzy representation; (6) Generate code; and (7) Integrate the code with other code in the target system.

Definition of the data set (step 1) is usually based on the normal trip points used in determining the charge levels in a conventional battery charging scheme. As an example, the trip points in a typical nickel-cadmium battery charging scheme are based on battery voltage, change in voltage over time, battery temperature, change in temperature over time, and maximum charge time. Therefore, the characteristics of the battery which pertain to battery voltage, temperature, and charge levels, and the correlations between them are of importance to the definition of the data set. For a lithium-ion battery, the trip points are based on battery voltage, change in voltage over time, temperature, change in temperature over time, internal resistance, and maximum charge time. Therefore, the characteristics of the battery which pertain to battery voltage, temperature, internal resistance, and charge levels are important in defining the data set.

The control input parameters chosen for the control system, which represent the internal state of the battery, should be easy to measure, using a low cost sensor and A/D converter. The relationship of these parameters to battery life and battery environment must be known. It should be known if the battery exhibits unique characteristics such as the memory effect. The battery of interest should be a fast charge type (i.e., typical fast charge batteries are rated for charge time of 1.5 hours or less). The data set should contain information about nonlinearities in the battery characteristics, and more data points are needed around the critical nonlinear portions of those characteristics.

Once these parameters are known, a table containing the values and corresponding output should be made. It is recommended that sufficient data points be available to account for the nonlinearities of the system. The data points should cover all the possibilities of input values within the input space. For a nickel-cadmium (NiCd) battery pack, 400 to 700 data point were found by the present inventors to be adequate to represent the input space. This table can be converted to an ASCII flat file format for ease in processing.

The configuration parameters for training the neural network, the number of fuzzy membership functions desired and the absolute accuracy desired from the system should also be defined. Training the neural network is an iterative process, requiring the user to study the error generated during training and to modify the learning neural network's parameters in an appropriate fashion to obtain convergence.

The fuzzy logic solution obtained from the trained neural network should be verified for accuracy and size. It is suggested that the accuracy of the solution be verified over the entire range of input space. An optimal fuzzy logic solution can be obtained by using a deletion factor to eliminate some of the less significant rules, with minimal effect on the accuracy of the solution.

Once the neural network has been trained and the accuracy of the fuzzy logic solution found acceptable, the controller code can be generated. The code generated by the neural network fuzzy logic technique described herein consists of relocatable assembly code designed for a processor such as the COP8 processor developed by National Semiconductor Corporation of Santa Clara, Calif. The code generated also includes the definitions for the RAM requirements. A log file indicating the amount of RAM and ROM used for the control code is also generated. The inventors used a COP880 microcontroller having 4K ROM and 128 bytes of RAM for the fast battery charger of the present invention. The COP8 code includes some general purpose math routines for multiplication and division and can be shared by other firmware modules.

To integrate the generated fuzzy logic assembly code with the rest of the code it is usually required that the inputs and output be preprocessed externally. It may also be necessary to process the input data acquired from the A/D converter and scale it. The scaled input is an 8-bit value and is stored in RAM. The fuzzy logic control code reads data from prescribed RAM locations and writes the output to other RAM locations.

Figure 8:
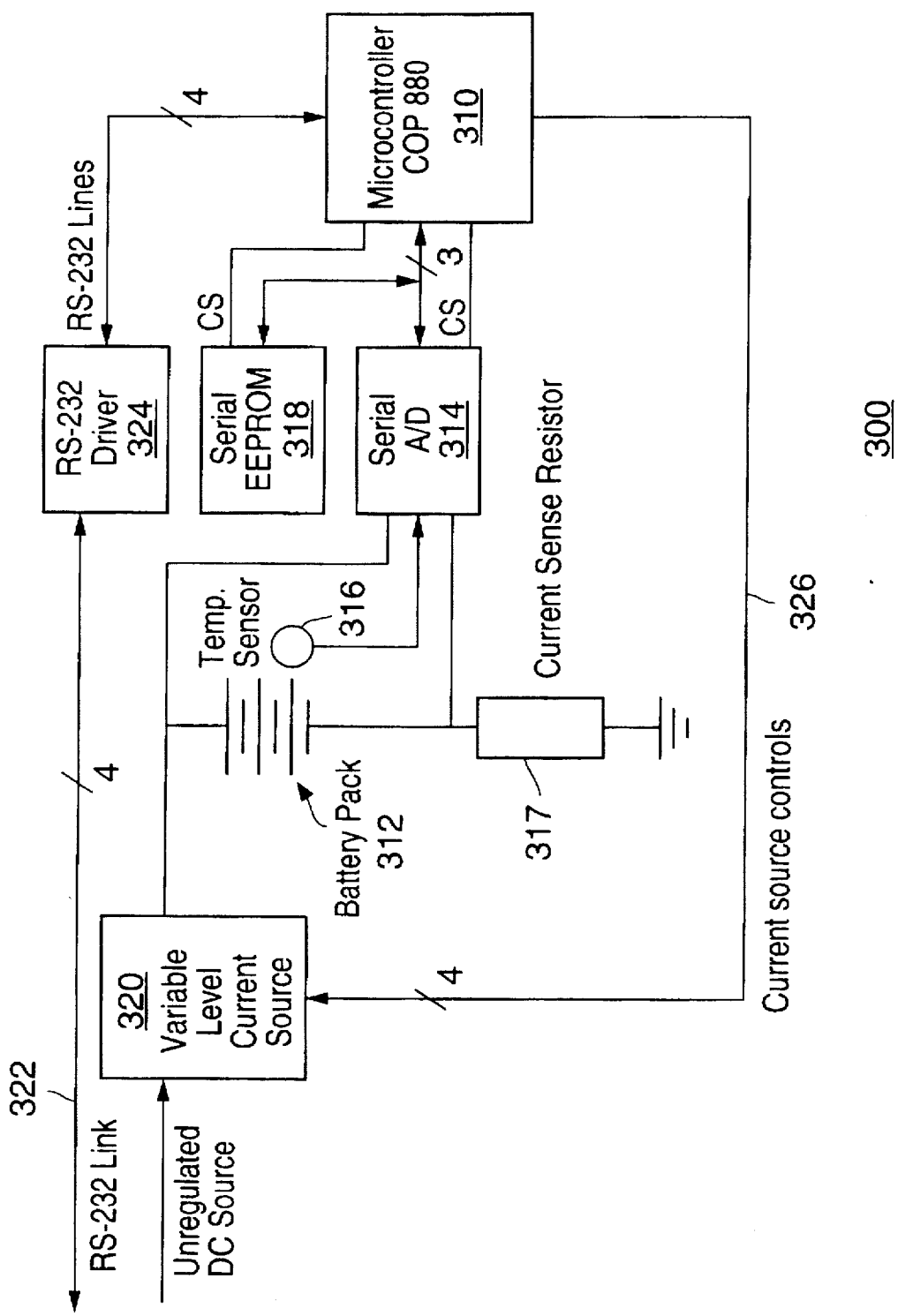
FIG. 8 is a block diagram of a fast battery charger of the present invention for charging secondary batteries.

FIG. 8 shows a block diagram of a fast battery charger 300 of the present invention for charging secondary batteries. Fast charger 300 includes a microcontroller 310 which contains firmware or software code which controls the charging process of battery pack 312. Serial analog-to-digital (A/D) converter 314 acquires data concerning the state of battery pack 312 during the charging process. This data typically consists of voltage, current, and temperature data which may be provided by a sensor, such as temperature sensor 316, or by current sense resistor 317. Historical data concerning the maximum and minimum voltage, current and temperature of battery pack 312 may be recorded in EEPROM 318, where the inventors have used a 16×128 bit memory for EEPROM 318. Information concerning the number of charge/discharge cycles and other data relevant to the charging process (such as manufacturer's specifications, etc.) may also be stored in EEPROM 318. Current for charging battery pack 312 is supplied by variable current source 320, which in the preferred embodiment has a plurality of discrete current levels, with the highest level corresponding to a rate of 5 C. Very low current levels are produced by modulating the duty cycle of the lowest discrete level. Current source 320 uses a National Semiconductor Corporation Simple-Switcher® switching regulator circuit with current feedback (not shown) in order to control the current produced by source 320. The level of current output by the switching regulator circuit is controlled by toggling four I/O lines of the COP8 microcontroller. A serial communication link 322 under the control of a serial communication link driver 324 provides a host with information on the charge status, historical battery parameters, and present charge level of battery pack 312.

As noted, microcontroller 310 of fast charger 300 controls the current output by current source 320 by means of control line(s) 326. Microcontroller 310 determines what current level (in charge per unit time) to instruct current source 320 to output based on the battery pack data acquired by serial A/D converter 314 or retrieved from EEPROM 318, and a charge control program resident in firmware contained in microcontroller 310 or a software program running on microcontroller 310. The intelligent fuzzy logic based controller determines the optimal current which battery pack 312 can accept during the charging process based on the internal state of the battery and the control system's learned knowledge of the characteristics of the battery.

Figure 1:
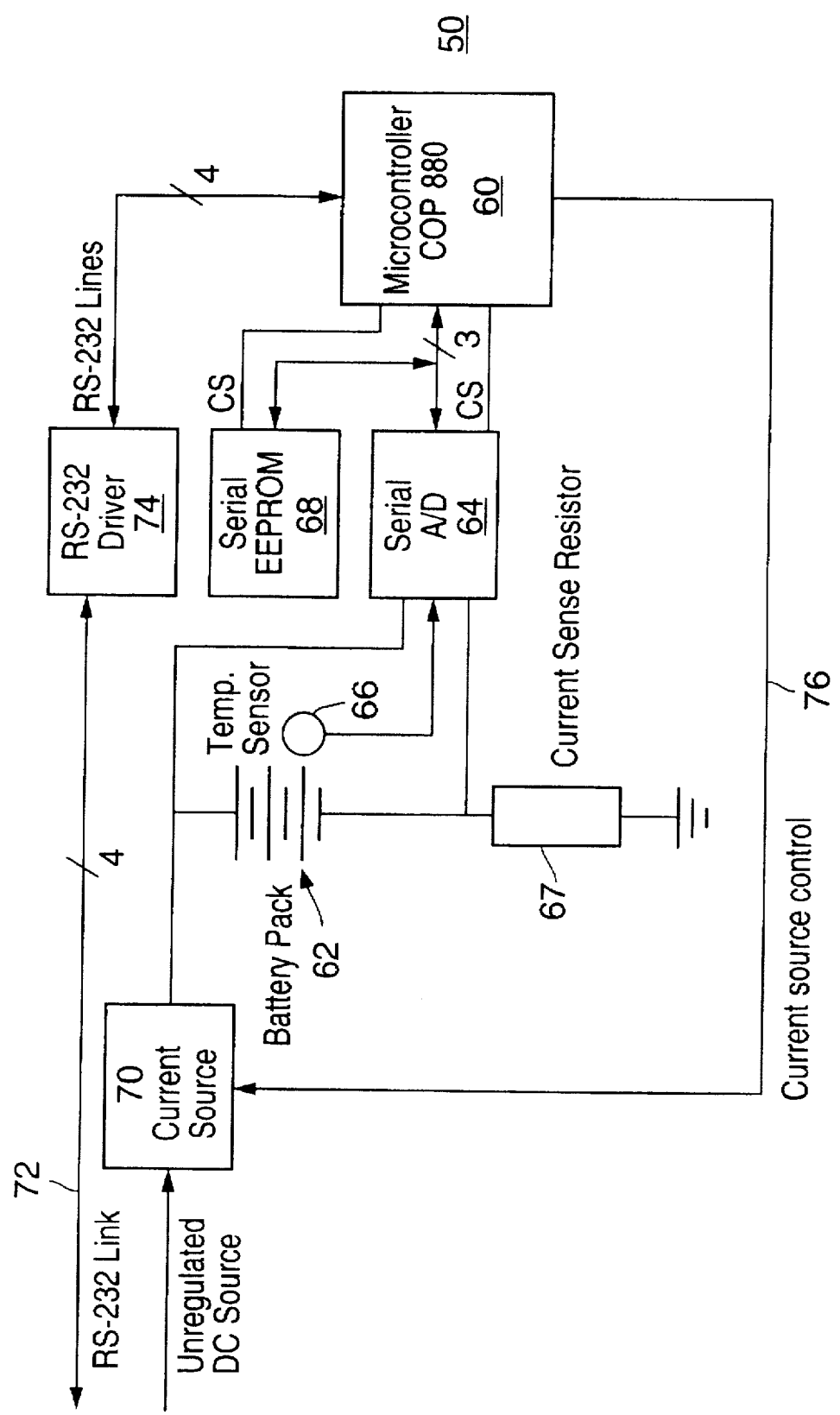
FIG. 1 is a block diagram of a conventional fast charger for charging secondary batteries.

A variable current source 320 is used in the fast battery charger of FIG. 8 because it allows the battery to be charged at a wide range of current levels during the charging process. This allows greater flexibility in tailoring the charge level to the state of the battery, thereby achieving an optimal charging scheme. In a conventional charger of the type shown in FIG. 1, the maximum current usually produced is 1 C. A higher rate is difficult (and may not be cost-effective) to achieve in conventional chargers because the number of trip points that can be tracked by a low-end microcontroller is limited. For instance, in order to use a current source capable of producing a charge rate of 5 C, at least 100 trip points would be needed, as well as the firmware for tracking them. This would place considerable demands on the microcontroller, both in terms of memory and processing capabilities. This is a primary reason why variable current sources are not used in conventional battery chargers.

Figure 9:
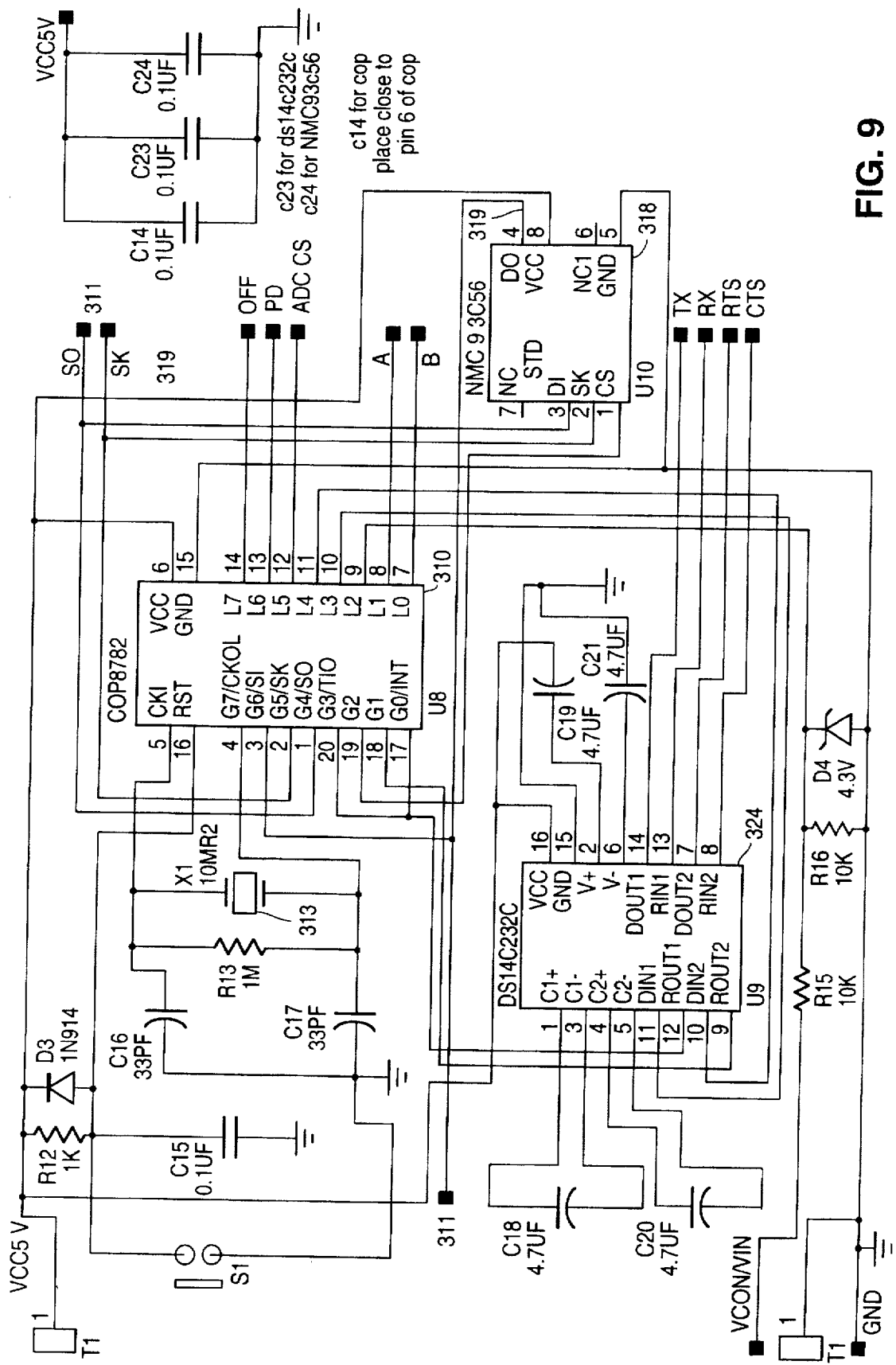
FIG. 9 is a schematic diagram showing the connections between the microcontroller, serial communication link driver, and EEPROM of the fast battery charger of the present invention.

FIG. 9 is a schematic diagram showing the connections between microcontroller 310, serial communication link driver 324, and EEPROM 318 of fast battery charger 300 of the present invention. Microcontroller 310 is driven with a crystal oscillator 313 having a frequency of 10 MHz. As indicated in the figure, microcontroller 310 communicates serially with communication link driver 324 and EEPROM 318, with serial communication between microcontroller 310 and EEPROM 318 being accomplished by means of microcontroller pins SI, SO, and SK 311 and EEPROM pins DI, DO, and SK 19. FIG. 9 also shows the reset and clock circuits for microcontroller 310.

Figure 10:
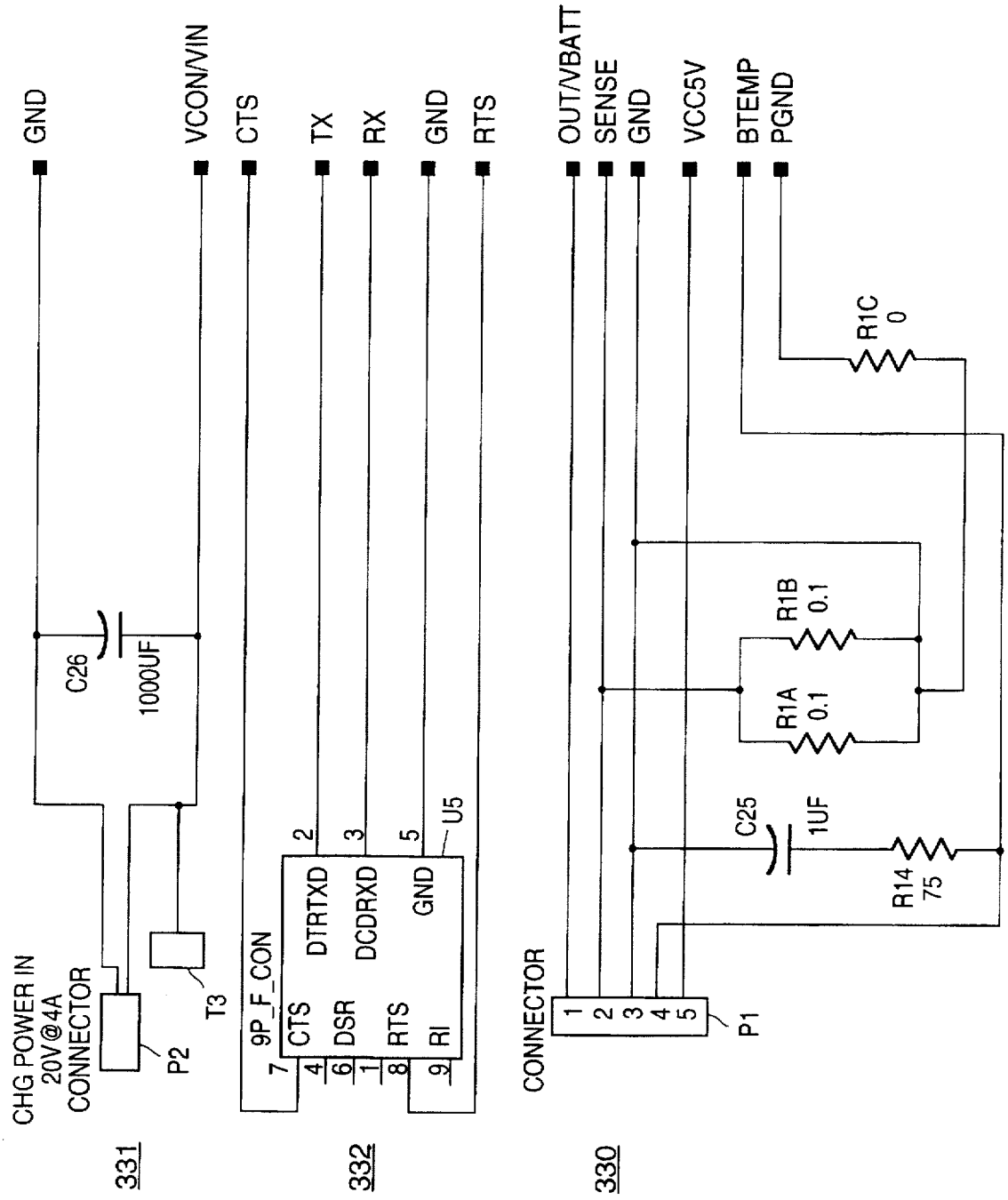
FIG. 10 is a schematic diagram showing the connections between the microcontroller, battery, and temperature sensor of the fast battery charger of the present invention.

FIG. 10 is a schematic diagram showing the connections between microcontroller 310, battery pack 312, and temperature sensor 316 of fast battery charger 300 of the present invention. As indicated, connector P1 330 is used to connect battery pack 312 and temperature sensor 316 (which is typically mounted on the battery pack) to microcontroller 310. Connector P2 331 connects an unregulated 18–24 volt DC power supply which is input to variable current source 320 to the battery charger circuitry by means of the Vcon and Vin connections shown in FIG. 9. Connector U5 332 is a nine pin female connector for providing RS-232 communications with the host computer.

Figure 11:
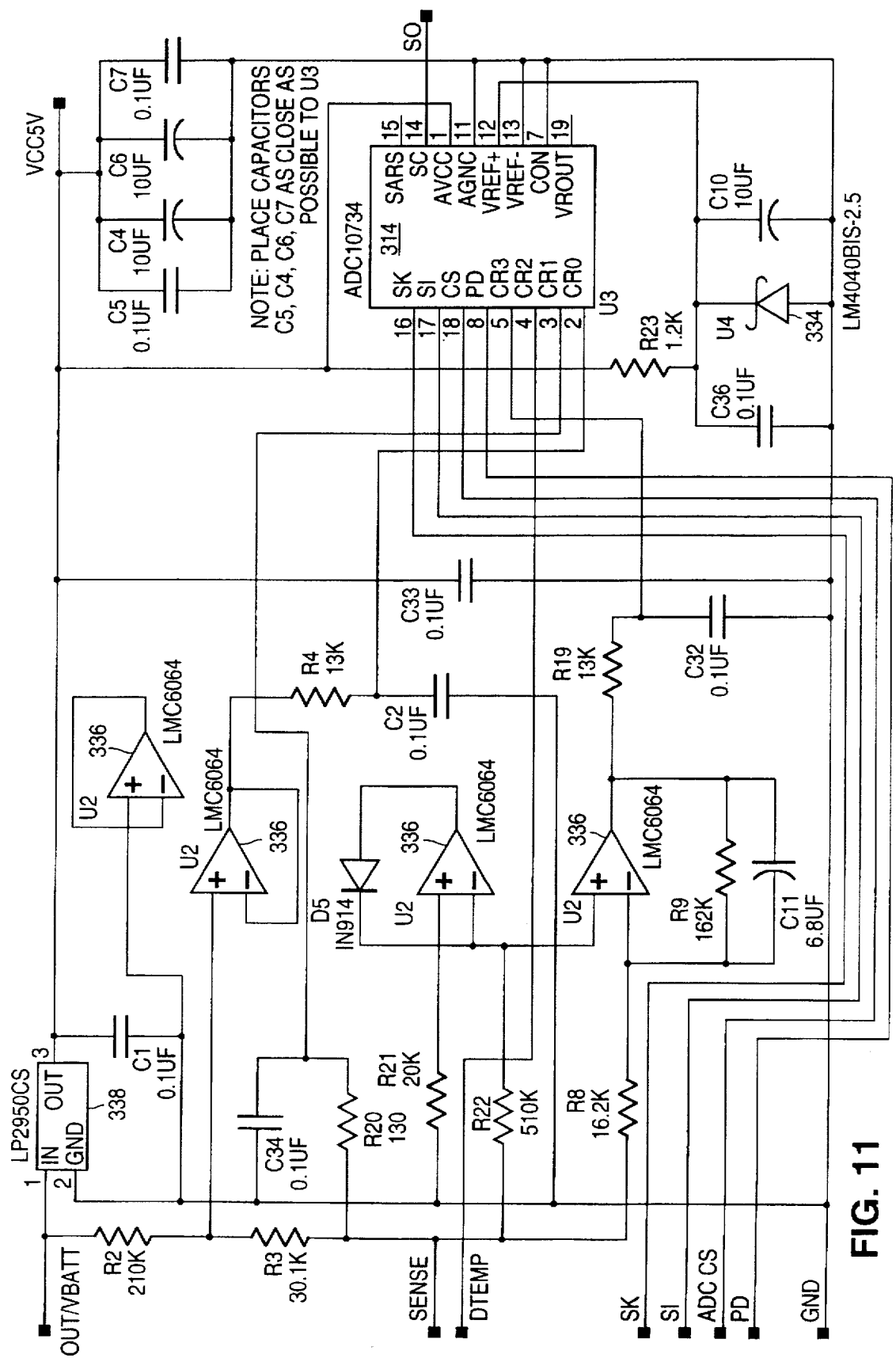
FIG. 11 is a schematic diagram showing the connections between the serial analog-to-digital converter and the other components of the fast battery charger of the present invention.

FIG. 11 is a schematic diagram showing the connections between serial analog-to-digital (A/D) converter 314 and the other components of fast battery charger 300 of the present invention. As previously mentioned, A/D converter 314 is a four channel, serial device which acquires and processes battery data indicating the voltage, current, and temperature of battery pack 312. In FIG. 11, diode 334 provides the reference voltage for A/D converter 314. Operational amplifiers 336 and their associated circuitry are used to scale the signals indicative of the voltage and current of battery pack 312 for input to A/D converter 314 during the charging process. The temperature data provided by temperature sensor 316 is input directly to A/D converter 314. Voltage source 338 provides 5 volts DC voltage for microcontroller 310.

Figure 12:
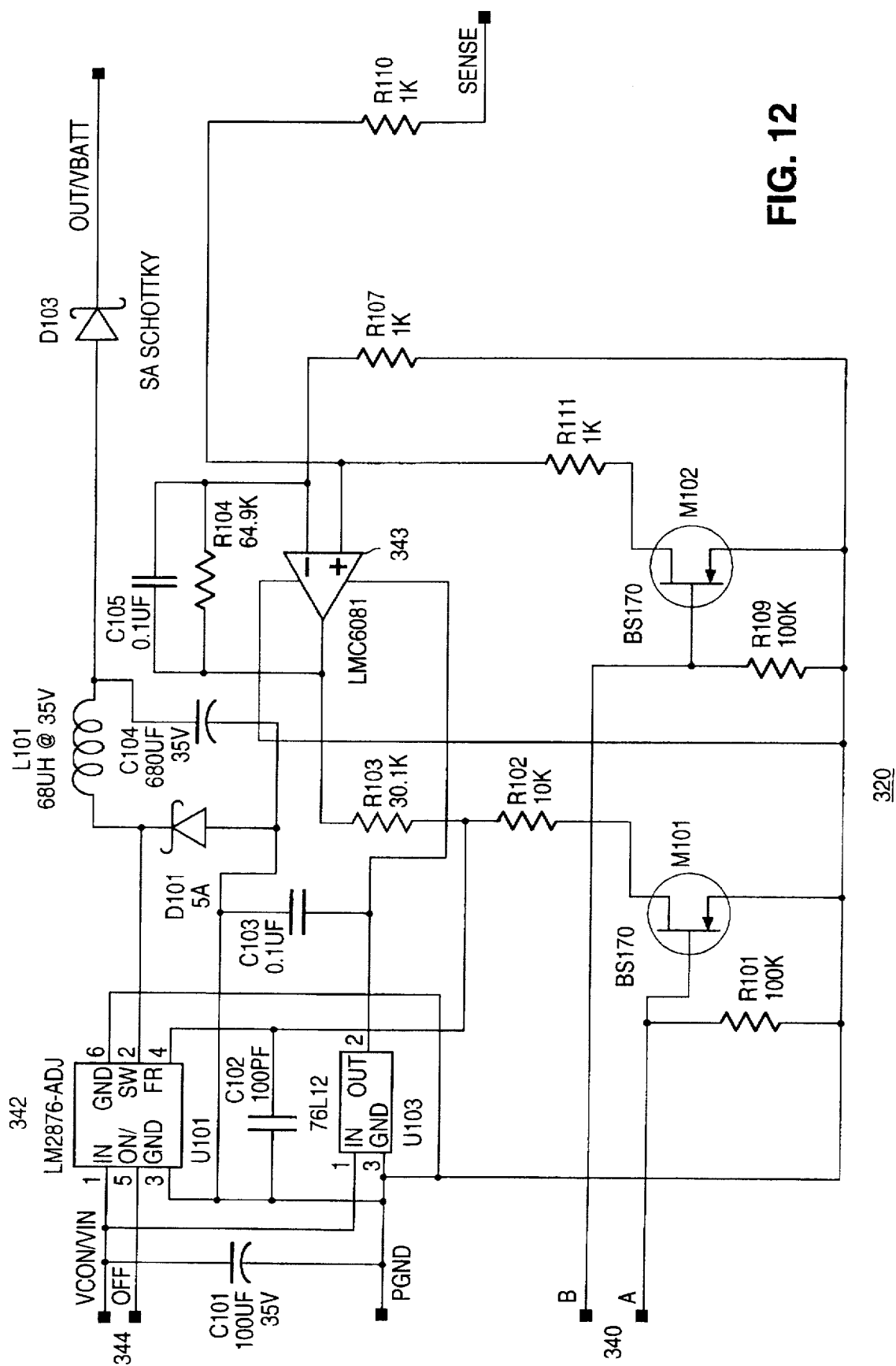
FIG. 12 is a schematic diagram of the variable current source of the fast battery charger of the present invention.

FIG. 12 is a schematic diagram of variable current source 320 of fast battery charger 300 of the present invention. Control signals 340 from microcontroller 310 are applied as inputs to cause current source 320 to produce varying levels of current, with typical values being 3.0 A, 1.5 A, 0.75 A, and 0.375 A. The current output level is determined by toggling the values of control signals 340 input to source 320. As noted, a switching regulator 342 with current feedback provided by operational amplifier 343 is used to maintain the current level during the operation of source 320. An on/off pin 344 is provided to enable/disable regulator 342.

The inventors of the present invention have recognized that the data set used to train the neural network fuzzy logic design system should be one which enables control and termination of the charging process to be based on a group of battery characteristics. The inventors have identified the desired control characteristics as: 1) coulometric control (total charge in battery); (2) time control (charge time at a specified charge level); (3) temperature sense control (basing charge level on temperature of battery); and (4) voltage sense control (battery voltage compensated for number of charge/discharge cycles).

The data set used to train the neural network is based on the battery charging characteristics provided by the manufacturer, and should include the recommended end of charge detection criteria. For charging NiCd batteries, the inventors utilized a data set derived from the following family of curves provided by the manufacturer: (1) battery voltage vs. percentage charge; (2) battery temperature vs. charge acceptance; (3) maximum charging current vs. percentage charge; and (4) change in voltage and temperature characteristics as a function of charge/discharge cycles.

In accordance with the present invention, the specific steps used to generate the training data from the above-identified manufacturer provided data are as follows:

(1) From the family of curves representing battery voltage vs. percentage charge, identify the curve which represents 50% of the estimated battery life at 50% of the average charging temperature. Prepare a data table having two columns (battery voltage, percentage charge) from this curve;

(2) From the family of curves representing battery temperature vs. maximum charge rate, identify the curve representing 50% of the estimated battery life. Prepare a data table having two columns from this curve;

(3) From the family of curves representing maximum charge rate vs. percentage charge, identify the curve representing 50% of the estimated battery life at 50% of the average charging temperature. Prepare a data table having two columns from this curve;

(4) Obtain the equation describing how the battery voltage varies with battery temperature from the manufacturer or by curve fitting to manufacturer supplied data;

(5) From the data tables constructed in steps 1-3 and the equation obtained from step 4, generate a table containing percentage charge vs. optimal charge rate data, where the optimal charge rate is the maximum charge rate at a given % charge level and the maximum charge rate at a given temperature;

(6) Prepare a data table representing coulomb count vs. percentage charge by accumulating the product of time and optimal charge rate for a given percentage charge; and (7) Using the data tables generated in steps 1-3 and 5-6, prepare a data table containing columns for battery voltage, battery temperature, coulomb count, and charge rate.

Thus, according to the present invention, a total of three inputs (voltage, temperature, and coulomb count) and one output (charge rate) are used to train the neural network fuzzy logic control system. In the actual control system, the battery voltage and temperature are provided by sensors, and the coulomb count is determined by using a register which sums the product of the charge rate and sampling interval to obtain a measure of the total charge input to the battery. After the training data is developed, it is adjusted to compensate for the number of charge-discharge cycles the battery has undergone. A constant value is added or subtracted from the battery voltage and battery temperature data in order to better match that data to the manufacturer supplied data curves. The resulting data is then used as the input data for the neural network fuzzy logic design system described previously. The fuzzy logic rules and membership functions produced by the design system are then edited to generate an acceptable (in terms of accuracy and complexity) model of the application for which the control program is being designed.

The table below compares the operation of a standard trip point based battery charger for a NiCd battery to the neural network fuzzy logic control based charger of the present invention.

TABLE 5

| Characteristic | Trip Point Based Charger | Neural Net Fuzzy Logic Charger |
|---|---|---|
| Processor | COP880C | COP880C |
| Control Method | trip point based current controller having 3 charging phases and 1C maximum charge rate | Adaptable, multilevel current controller having 5C maximum charge rate |
| Charging Cycle Time | 30–70 minutes | 10–20 minutes |
| Code Size (ROM) | 800 bytes | 2100 bytes |

TABLE 5-continued

| Characteristic | Trip Point Based Charger | Neural Net Fuzzy Logic Charger |
|---|---|---|
| Data Memory (RAM) | 30 bytes | 52 bytes |
| Charging Loop Update | 50–100 ms, 10 MHZ clock | 100–150 ms, 10 MHz clock |
| Data Measured | Temperature, Voltage, Current | Temperature, Voltage, Current |

As noted, the present invention achieves a fast charging time by using a nonlinear control algorithm, which controls the charging current by tailoring the current to the optimal battery characteristics. Higher charge currents are supplied to the battery during initial stages of the charge cycle. Charge levels are subsequently lowered based on monitoring the battery parameters and the operation of the control engine.

The code for charge control embedded in the microcontroller's ROM comprises two major sections. The first section is the fuzzy logic inference engine, and the second is the fuzzy logic data tables, which correspond to battery specific charging characteristics. The size of the fuzzy logic inference engine is fixed, and is approximately 600 bytes. The fuzzy logic rule base has 294 rules for the example of a nickel cadmium battery pack. The number of fuzzy membership functions correspond to 7 for voltage, 7 for temperature and 6 for time. The algorithm is computationally intensive and does the loop update 6 to 10 times per second.

The current source presently used by the inventors can deliver up to 3.0 A of charging current and provides up to a 5 C rate for batteries of 700 mAH capacity. Other types of switching regulators than that mentioned may be used, and changing the rating of the current source can be accomplished by altering the switching regulator.

The EEPROM can be used to record historical such as the maximum and minimum battery temperature, battery voltage, previous charge level and number of complete discharge cycles. In addition, space may be allocated in the EEPROM to record the battery manufacturer's warranty information. The maximum and minimum safe levels of battery operation can also be stored in the EEPROM. This information can act as a final safety measure to shut off the charger if the charge control algorithm or peripheral hardware fails.

In the present embodiment of the invention, serial host communications are performed using software written in firmware with RS-232 protocols and XON/XOFF handshaking. The present battery conditions and the historical battery values stored in the EEPROM can be provided to the host by this communication link. This serial link can also be used to program the warranty information, safe maximum and minimum battery charging parameters in the EEPROM.

Although the example described above is for a NiCd battery, the present invention may be used to design a neural network fuzzy logic based control scheme for any type of battery. In order to use the described methodology for other types of batteries, new control system firmware needs to be generated. A new data set which defines the battery characteristics is used to train the neural network, producing a set of fuzzy logic membership functions and rules which characterize the system. These new membership functions and rules are then verified and optimized. Assembly code for the control scheme is then generated. The assembly code represents the fuzzy logic controller firmware, which can be integrated with the rest of the battery charger firmware using the microcontroller assembler. The result is a new charging scheme which is optimized for the new battery.

In accordance with the present invention, there has been described a method and apparatus for fast charging of secondary cells or batteries. The method is based on a nonlinear control scheme which uses fuzzy logic membership functions and fuzzy logic rules to determine the charge to be applied to the battery. The fuzzy logic membership functions and fuzzy logic rules are generated by a neural network which uses training data indicative of a battery's charging characteristics to develop the membership functions and rules which represent the battery's charging behavior. The fuzzy logic representation is then embedded into a controller by being burnt into a ROM. A fuzzy logic representation for another type of battery can be produced by following the same methodology and then burning the new representation into a new ROM module in the controller.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

We claim:

1. A method of fast charging a battery, comprising:

providing a variable current source to supply current to charge the battery, wherein the current source delivers current at a plurality of levels;

measuring a parameter indicative of an internal state of the battery; and controlling the level of charge supplied to the battery by the current source by means of a controller having an input and an output, wherein the input is a value of the measured parameter and the output of the controller is a signal which determines the level of current supplied by the current source, and further, wherein the output of the controller is determined according to the steps of inputting data representing a charge rate of the battery as a function of the measured parameter to a neural network;

generating a fuzzy logic rule and membership function representing the battery's charging characteristics as an output of the neural network; and generating a set of instructions which control the operation of the controller to produce the controller output from the controller input, the instructions being generated from the fuzzy logic rule and membership function.

2. The method of claim 1, wherein the measured parameter is a member of the group consisting of the battery voltage, the battery temperature, and the current flowing into the battery.

3. The method of claim 1, wherein the generation of the fuzzy logic membership function and fuzzy logic rule by the neural network comprises the steps of:

receiving a signal representing the input data;

transforming the received signal into fuzzified data;

inputting the fuzzified data into a neuron layer which generates an output which includes a signal corresponding to a fuzzy logic membership function; and inputting the membership signal into a neuron layer which generates an output which includes a logic rule signal representing a fuzzy logic rule.

4. A fast charging device for a battery, comprising:

a variable current source to supply current to charge the battery, wherein the current source delivers current at a plurality of levels;

a sensor for measuring a parameter indicative of an internal state of the battery; and a controller having an input and an output which controls the level of charge supplied to the battery by the current source, wherein the input to the controller is a value of the measured parameter and the output of the controller is a signal which determines the level of current supplied by the current source, and further, wherein the output of the controller is determined by executing a set of instructions which control the operation of the controller, the instructions being derived from a fuzzy logic membership function and fuzzy logic rule which represent the battery's charging characteristics, the controller further comprising a neural network having a charge rate of the battery as a function of the measured parameter as an input and the fuzzy logic membership function and fuzzy logic rule as an output.

5. The fast charging device of claim 4, wherein the sensor measures a parameter which is a member of the group consisting of the battery voltage, the battery temperature, and the current flowing into the battery.

6. The fast charging device of claim 5, wherein the neural network comprises:

a first plurality of neurons for receiving a signal representing the input data for the controller and for providing fuzzified data which corresponds to the input data;

a second plurality of neurons coupled to the first plurality of neurons for receiving the fuzzified data and generating a membership signal which corresponds to a fuzzy logic membership function; and a third plurality of neurons coupled to the second plurality of neurons for receiving the membership signal and generating a logic rule signal which represents a fuzzy logic rule.

\* \* \* \* \*